US010407078B2

(12) United States Patent
Ratnasingam

(10) Patent No.: US 10,407,078 B2
(45) Date of Patent: Sep. 10, 2019

(54) DYNAMIC LEARNING DRIVING SYSTEM AND METHOD

(71) Applicant: Sivalogeswaran Ratnasingam, Petersham (AU)

(72) Inventor: Sivalogeswaran Ratnasingam, Petersham (AU)

( * ) Notice: Subject to any disclaimer, the term of this patent is extended or adjusted under 35 U.S.C. 154(b) by 193 days.

(21) Appl. No.: 15/139,322

(22) Filed: Apr. 26, 2016

(65) Prior Publication Data

US 2017/0305434 A1    Oct. 26, 2017

(51) Int. Cl.
| | |
|---|---|
| *G06F 19/00* | (2018.01) |
| *G06G 7/70* | (2006.01) |
| *B60W 40/09* | (2012.01) |
| *G06N 20/00* | (2019.01) |
| *G05D 1/00* | (2006.01) |
| *G06Q 40/08* | (2012.01) |

(52) U.S. Cl.
CPC ......... *B60W 40/09* (2013.01); *G05D 1/0011* (2013.01); *G05D 1/0088* (2013.01); *G06N 20/00* (2019.01); *G06Q 40/08* (2013.01)

(58) Field of Classification Search
None
See application file for complete search history.

(56) References Cited

U.S. PATENT DOCUMENTS

| | | | | |
|---|---|---|---|---|
| 5,570,087 | A * | 10/1996 | Lemelson | G07C 5/085 340/439 |
| 6,227,862 | B1 * | 5/2001 | Harkness | G09B 9/05 434/238 |
| 6,909,947 | B2 | 6/2005 | Douros et al. | |
| 7,149,607 | B2 * | 12/2006 | Dorey | G01M 17/007 701/1 |

(Continued)

FOREIGN PATENT DOCUMENTS

| | | |
|---|---|---|
| DE | 4420469 | 12/1995 |
| DE | 10256612 | 7/2004 |

(Continued)

*Primary Examiner* — Bhavesh V Amin
(74) *Attorney, Agent, or Firm* — Michael D. Eisenberg

(57) ABSTRACT

A system, method, and computer program product are described for dynamically assessing and improving driver performance, including that of an autonomous driving system. Based on received electronic driver performance messages, the system determines whether an instant feedback message is required to dynamically adjust driving behavior of a subject driver or autonomous driving system. If yes, then the system provides an instant feedback message, otherwise the system provides an aggregate feedback message, calibration message, and/or coaching recommendation as appropriate. An aggregate feedback message may be provided based at least on integral rating and/or driver performance score calculated and based at least on the driver performance messages received over a predetermined time period. The system may be adapted to perform one or more of the following: calculate insurance premium, insurance (Continued)

coverage, calculate cost of hiring a vehicle, monitor driving quality of drivers, recruit drivers, provide incentives, provide coaching, provide driver performance reports, and inform a third party about the driving performance of a subject driver.

24 Claims, 14 Drawing Sheets

(56) References Cited

U.S. PATENT DOCUMENTS

| | | | |
|---|---|---|---|
| 7,389,178 B2* | 6/2008 | Raz | G07C 5/085 |
| | | | 340/903 |
| 7,659,827 B2* | 2/2010 | Gunderson | G08G 1/16 |
| | | | 340/576 |
| 7,694,115 B1* | 4/2010 | Porras | H04L 41/142 |
| | | | 340/506 |
| 7,769,499 B2 | 8/2010 | McQuade et al. | |
| 8,117,049 B2 | 2/2012 | Berkobin et al. | |
| 8,188,887 B2 | 5/2012 | Catten et al. | |
| 8,314,708 B2 | 11/2012 | Gunderson et al. | |
| 8,554,468 B1* | 10/2013 | Bullock | G01S 19/14 |
| | | | 701/408 |
| 8,577,703 B2 | 11/2013 | McClellan et al. | |
| 8,606,492 B1* | 12/2013 | Botnen | G07C 5/008 |
| | | | 701/123 |
| 8,630,768 B2 | 1/2014 | McClellan et al. | |
| 8,880,239 B2* | 11/2014 | Kleve | B60R 25/24 |
| | | | 701/2 |
| 8,963,740 B2 | 2/2015 | Koukoumidis et al. | |
| 8,989,914 B1* | 3/2015 | Nemat-Nasser | G06F 7/00 |
| | | | 340/988 |
| 8,996,234 B1* | 3/2015 | Tamari | G07C 5/0808 |
| | | | 701/29.3 |
| 9,047,721 B1* | 6/2015 | Botnen | G07C 5/008 |
| 9,081,650 B1* | 7/2015 | Brinkmann | G07C 5/008 |
| 9,461,992 B2* | 10/2016 | Outwater | H04L 63/0861 |
| 9,558,656 B1* | 1/2017 | Brinkmann | G07C 5/008 |
| 9,589,393 B2* | 3/2017 | Botnen | G07C 5/008 |
| 9,672,734 B1* | 6/2017 | Ratnasingam | G08G 1/0112 |
| 2002/0116156 A1* | 8/2002 | Remboski | G07C 5/0808 |
| | | | 702/188 |
| 2002/0120374 A1* | 8/2002 | Douros | G07C 5/0808 |
| | | | 701/34.4 |
| 2004/0210353 A1* | 10/2004 | Rice | G01C 21/26 |
| | | | 701/1 |
| 2006/0112103 A1* | 5/2006 | Besserman | G06Q 10/10 |
| 2006/0161315 A1* | 7/2006 | Lewis | G08G 1/20 |
| | | | 701/1 |
| 2006/0200277 A1* | 9/2006 | Yoshida | G09B 9/05 |
| | | | 701/1 |
| 2006/0253307 A1* | 11/2006 | Warren | G06Q 40/08 |
| | | | 705/4 |
| 2007/0005404 A1 | 1/2007 | Raz et al. | |
| 2008/0105482 A1* | 5/2008 | Yamaguchi | G05B 15/02 |
| | | | 180/271 |
| 2008/0122603 A1* | 5/2008 | Plante | B60W 40/08 |
| | | | 340/439 |
| 2008/0255722 A1* | 10/2008 | McClellan | B60R 25/102 |
| | | | 701/31.4 |
| 2009/0024419 A1* | 1/2009 | McClellan | G06Q 40/02 |
| | | | 705/4 |
| 2009/0132294 A1* | 5/2009 | Haines | G06Q 40/08 |
| | | | 705/4 |
| 2010/0157061 A1* | 6/2010 | Katsman | G07C 5/008 |
| | | | 348/149 |
| 2011/0090075 A1* | 4/2011 | Armitage | B60W 40/09 |
| | | | 340/439 |
| 2011/0320492 A1* | 12/2011 | Inghelbrecht | G06Q 40/08 |
| | | | 707/776 |
| 2012/0066007 A1* | 3/2012 | Ferrick | G06Q 30/0283 |
| | | | 705/4 |
| 2013/0073114 A1* | 3/2013 | Nemat-Nasser | B60W 40/09 |
| | | | 701/1 |
| 2013/0138460 A1* | 5/2013 | Schumann, Jr. | G06Q 40/08 |
| | | | 705/4 |
| 2014/0052672 A1* | 2/2014 | Wagner | G06Q 10/06398 |
| | | | 705/500 |
| 2014/0129053 A1* | 5/2014 | Kleve | B60R 25/24 |
| | | | 701/2 |
| 2014/0129113 A1* | 5/2014 | Van Wiemeersch | F02D 28/00 |
| | | | 701/102 |
| 2014/0223531 A1* | 8/2014 | Outwater | H04L 63/0861 |
| | | | 726/7 |
| 2015/0161913 A1* | 6/2015 | Dominguez | G09B 19/167 |
| | | | 434/65 |
| 2015/0243111 A1* | 8/2015 | Botnen | G07C 5/008 |
| | | | 701/99 |
| 2015/0306763 A1* | 10/2015 | Meier | G05B 19/42 |
| | | | 700/248 |
| 2016/0283963 A1* | 9/2016 | Zafiroglu | G06Q 30/0224 |
| 2017/0200061 A1* | 7/2017 | Julian | G06T 11/60 |

FOREIGN PATENT DOCUMENTS

| | | |
|---|---|---|
| DE | 102013000131 | 7/2014 |
| WO | WO1992003803 | 3/1992 |
| WO | WO2000007150 | 2/2000 |
| WO | WO2008001125 | 1/2008 |

\* cited by examiner

Combined rating = $A_1$ (Metric 1)

$+ A_2$ (Metric 2)

$+ A_3$ (Metric 3)

$+ A_4$ (Metric 4)

$+ A_5$ (Metric 5)

Combined rating = $B_1$ (User 1)

$+ B_2$ (User 2)

$+ B_3$ (User 3)

$+ B_4$ (User 4)

$+ B_5$ (User 5)

DYNAMIC LEARNING DRIVING SYSTEM AND METHOD

FIELD OF THE INVENTION

The present disclosure relates generally to the use of a plurality of observer devices to monitor and improve diver performance, including that of an autonomous driving system.

BACKGROUND OF THE INVENTION

Road safety is a collective responsibility of all road users including vehicle drivers, motor cyclists, bicyclists, and pedestrians. Poor road safety may cause accidents. The causes of accidents include breaking the road rules and bad quality of driving (or bad driving performance). Accidents may be minimized if road users collectively identify the particular users whose actions may cause inconvenience or pose hazard to others and inform these users about their behavior by some appropriate means.

In general the bad driving quality of a driver may cause traffic congestion and even may cause accident. In addition, a driver with bad driving quality may also increase maintenance cost of a vehicle, increase emissions, and affect other road users. In some situations, drivers may not be aware of their driving mistakes and their quality of driving. For example, a driver may lose concentration on driving due to distraction or other reasons. This loss of concentration on driving may cause the vehicle to go too close to the vehicle ahead or cross lane markings and may pose potential hazard to other road users, disruption to smooth flow of traffic or even cause an accident.

Improving driving quality of drivers is good for improving the safety of all road users. Generally, learner drivers get training or coaching to pass a driving test, and once they successfully completed the test, they receive minimal or no formal training, or even any kind of feedback message on their quality of driving to further improve thereof. There are systems developed to provide feedback based on the data received from sensing devices. However, these systems are generally expensive and do not provide a human level of assessment on every aspect of driving depending on the current traffic conditions. For example, systems monitoring velocity, acceleration and braking of a vehicle may not provide correct a feedback message on whether a driver maintains the vehicle within the lane markings, stops before the lines marked at a traffic signal, correctly indicates before making a turn, or maintains a safe distance from the vehicle ahead. Sometimes, the maximum safe speed for a road segment may not always be the posted speed. It may depend on a number of factors including weather conditions, traffic conditions, and road conditions. Further, if there are children playing on roadside or animals crossing the road, it is not advisable to drive in a high speed or even at the posted speed. However, it is difficult for a sensor-based system to account for all the different factors when assessing the driver performance.

In particular, providing feedback message on each aspect of driving (whether minor or major violations) instantly or at an appropriate time may be useful to identify on what aspect of driving a driver needs improvement, and on what driving aspects a driver is performing well. Further, if a system provides an appropriate user interface to easily identify the vehicle involved in the violation, collect appropriate data automatically, and provide an appropriate interface based on the current conditions may be useful for a user to send appropriate messages related to the performance of a driver. A human may be able to assess the current situation better than a sensor based system and provide ratings on the performance of a driver appropriately. Providing some kind of feedback message instantly or at a later time on the driving quality of a driver is good for constantly improving the quality of driving or driving performance. Based on the feedback message, a driver may take steps to improve the particular aspects of driving that need to be improved. Good drivers may maintain their good quality of driving and bad drivers may take steps to improve their driving quality. Providing quick feedback message on driving improves the quality of all drivers. Improved quality of driving is good for better road safety, less accidents, reduced cost of vehicle maintenance, and good driving experience for all road users.

SUMMARY OF THE INVENTION

A brief description of some of the embodiments of the invention is provided in this section. This section is not intended to provide the entire details of the invention however, a more detailed description is provided later.

According to one aspect of the invention a system, method, and computer program product are described for rating at least one driving event performed by a subject driver of a target vehicle. In the rest of this document, several exemplary embodiments are described based on either a method or a system however, one of ordinary skill in the relevant art would be able to implement and use the invention in at least one of method, system, and/or computer program product.

In an embodiment of the invention, a method for assessing driver performance based at least on a driver performance message received from at least one user is described. The method receives driver performance messages at a computer server system from at least one user wherein, the driver performance message is provided by a user for at least one driver performance metric associated with at least one driving event performed by a subject driver of a target vehicle. The driver performance message is at least one from a list including, but not limited to alert, warning, caution, rating, and notification sent by a user to a subject driver of a target vehicle wherein, the user (observer user) is within a predetermined distance from the location of the driving event at the time the driving event occurred. Based on the received driver performance messages the method determines whether an instant feedback message is required to the subject driver. An instant feedback message is provided in an appropriate form to the subject driver if the driver's immediate attention is required in response to one or more driver performance messages. The method further includes providing a feedback message to the subject driver based at least on one or more driver performance messages being received over a predetermined time period. Aggregate feedback message(s) may be provided at an appropriate later time when the subject driver stops driving, or when the cognitive load of the driver is below a predetermined threshold or when the driver reaches home.

In a preferred embodiment of the invention, the method may further include determining at least one of integral rating and driver performance score at least in part upon the driver performance messages received over a predetermined time period. The driver performance score and/or integral rating may be determined based at least on one from a list including (a) one of linear and nonlinear combination of the driver performance messages received from a plurality users based at least on their credibility, (b) when a plurality of users provided driver performance messages for a driving event, the method may take the message received from the most credible user or statistical mean or other appropriate statistical value representing the messages, (c) one of linear and nonlinear combination of the plurality of driver performance metrics depending on the application for which the driver performance score is used, (d) applying increasing weight (either linear or nonlinear increase) with number of times the same driving event is performed by a subject driver within a predetermined time period, (e) applying increasing weight (either linear or nonlinear increase) with percentage of a measurement (non-limiting example: speed) exceeded a predetermined threshold, (f) applying increasing weight (either linear or nonlinear increase) with how long the driving event continued after the subject driver has received an instant feedback message from driver performance rating system in response to at least one driver performance message, and any combination thereof.

In an embodiment of the invention, the method may include providing coaching based at least on the integral rating and/or driver performance score wherein, coaching to a human driver is provided in at least one from a list including text, audio, video, multimedia, driving simulation, and driver training provided by a computer instructor or a human instructor. Coaching to an autonomous driving system may be at least improving the driving aspects that are associated with the received driver performance messages. In particular, adjusting at least one calibration factor of the driving system of the autonomous vehicle (target vehicle) such that to improve driving performance of the autonomous driving system of the target vehicle based on the aggregate vehicle driving data obtained from sources including a plurality of observer user devices. In some embodiment the vehicle driving data may be determined by proximity sensors.

In an embodiment of the invention, the method may include verifying the driver performance messages received from a first user by comparing with at least one of proximity sensor data and the driver performance messages received from other users for the same driver performance metric for the same driving event performed by the same subject driver.

In an embodiment of the invention, the method may include at least one of recruiting employees and/or managing employees in a company based at least on integral rating and/or driver performance score.

In a preferred embodiment of the invention, the method may include at least one from a list including, but not limited to (a) monitoring driving performance of at least one driver (subject driver) in a group of drivers, (b) producing a driver performance report for a third party, (c) determining whether a learner driver is ready for taking a driving test, (d) informing a third person/entity about the driving behavior of a subject driver, (e) rank ordering drivers among a group of drivers, and any combination thereof. The above list of tasks may be performed based at least on the received driver performance messages, determined integral rating and/or driver performance score. The third person/entity may include one from a list including, but not limited to parent/guardian, driving instructor, vehicle owner, a person responsible for the vehicle, police, fleet management company, and other appropriate entity responsible for transport in the region/country.

In another preferred embodiment of the invention, the method may include at least one of providing an incentive to subject drivers whose driver performance score is above a predetermined threshold and/or an element of the integral rating is above another appropriate predetermined threshold.

In an embodiment, elements of the integral rating may be determined by appropriately combining the driver performance messages received from a plurality of observer user devices for each driving aspect (non-limiting examples: maintaining a target vehicle within lane makings, correct indication when turning, maintaining appropriate head space, and maintaining correct speed) separately. In other embodiments, penalizing subject drivers whose driver performance score is below another predetermined threshold and/or at least one element in the integral rating is below a further predetermined threshold. The thresholds may be different and can be appropriately chosen by a person of ordinary skill in the relevant art. The incentive is at least one from a list including bonus, pay rise, promotion, price discount, tax incentive, other financial benefits, and social benefits. The penalty may include at least one from a list including increased taxation, charging a higher price when purchasing goods/services related to a vehicle, compulsory coaching, suspension of driver license, and any combination thereof.

In an embodiment of the invention, the method may include determining at least one of insurance premium and insurance coverage based at least on the driver performance messages received over a predetermined time period wherein, the predetermined time period includes present, and/or past time.

In an embodiment of the invention, the method may include determining insurance premium and/or insurance coverage based at least on the estimated values of at least one of an integral rating and a driver performance score for an appropriate future predetermined time period (this future time period may or may not include the time period for which insurance is to be covered). An integral rating and/or driver performance score for the future time period may be estimated using different methods including at least one of pattern recognition or machine learning algorithms from a list including, but not limited to extrapolation, regression, Kalman filter, particle filter, Markov chain, Bayesian algorithm, and artificial neural network. The method may further receive driver performance messages while insured (either the entire insured period or part of the insured period) and calculates driver performance score and/or integral rating wherein, the method compares the calculated driver performance score and/or integral rating to that of the estimated values. If the difference is larger than a predetermined threshold, the method recalculates the insurance premium and/or amends the insurance coverage. The predetermined time periods and other threshold values may be chosen appropriately for the driver performance score and integral rating at different steps of the method by a person of ordinary skill in the relevant art. In a preferred embodiment, the future time period to estimate the driver performance score may be the same as that of the time period for which the insurance is required.

In an embodiment of the invention, the method may include determining the cost of hiring a vehicle based at least on the driver performance messages received over a predetermined time period wherein the predetermined time period may include the past time period.

In another embodiment, the method may determine the cost of hiring a vehicle based at least on the estimated values of driver performance score and/or integral rating for an appropriate future predetermined time period wherein the future time period may or may not depend on the time period for which the vehicle is to be hired. The method for estimating driver performance score and/or integral rating for the future predetermined time period may include an appropriate pattern recognition or machine learning algorithm. The method may further receive driver performance messages while the vehicle is hired (the entire duration of hired period or part of the hired period) and calculates driver performance score and/or integral rating. Then, the method compares the calculated values to that of the estimated values. If the difference is larger than a predetermined threshold, the method recalculates the vehicle hire cost. The predetermined threshold values and time periods may be chosen appropriately for the driver performance score and integral rating at different steps of the method by a person of ordinary skill in the relevant art. In a preferred embodiment, the future time period to estimate the driver performance score and/or integral rating may be the same as that of the time period for which the vehicle is to be hired.

In an embodiment of the invention, the method may appropriately process the received driver performance messages to detect and remove outliers using thresholding, appropriate statistical analysis such as analysis of variance, mean shift algorithm, and the like.

In an embodiment of the invention, the method may identify neighboring vehicles to a user using proximity sensor devices including radio communication devices. The method may display neighboring vehicles on a display device representing at least one from a list including make, model, color, size, and at least one alphanumeric character in the registration of the vehicle. In another embodiment of the invention, the method may generate driver performance messages automatically based at least on appropriate proximity sensor measurements. The proximity sensors may include, but not limited to imaging devices (non-limiting examples: image or video in the visible, infrared or other appropriate wavelength ranges), localization devices (satellite based, terrestrial based, and image based localization devices), Light Detection and Ranging (LIDAR), radar, wireless communication signal based sensing devices, and the like.

In an alternative embodiment of the invention, a group of user devices may form one or more cliques and send driver performance messages to the rating server via their respective clique leader. In an embodiment of the invention, the leader of a clique may provide a feedback message based at least on the received driver performance messages. In an alternative embodiment, the rating server may determine a feedback message and send the feedback message to the user device in the target vehicle via an appropriate clique leader.

BRIEF DESCRIPTION OF THE FIGURES

It is to be understood that the drawings are exemplary schematic illustrations to show embodiments of the invention and for illustrating the principles thereof. It is noted that the drawings are not to scale. The invention will be described in more detail with reference to the accompanying drawings that represent embodiments of the invention. In the drawings:

FIG. 10a shows a schematic illustration of combining driver performance messages received for a plurality of driver performance metrics according to an embodiment of the invention;

FIG. 10b shows a schematic illustration of combining driver performance messages received from a plurality of observer user devices for a particular driver performance metric according to an embodiment of the invention;

DETAILED DESCRIPTION

Figure 1A:
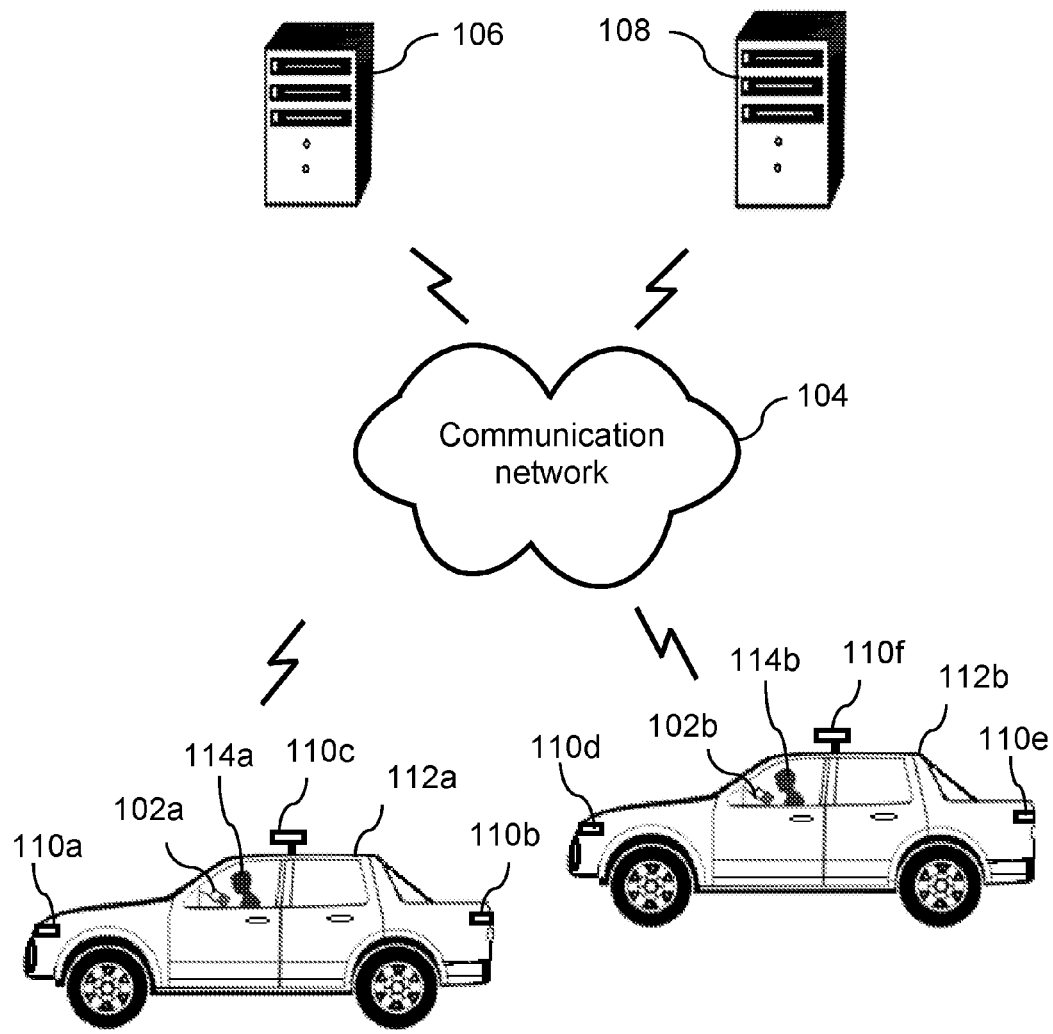
FIG. 1a is a schematic diagram of a driver performance rating system that may be implemented in accordance with an embodiment of the invention.

According to some embodiments of the invention, a system, method, and computer program product are described in reference to assessing the performance of one or more drivers (subject drivers), providing feedback message to dynamically adjust the driving behavior, monitoring drivers, providing coaching, providing incentive/punishment, calculating insurance premium and coverage, producing driver performance report, and calculating cost of hiring a vehicle based at least on driver performance messages received from one or more observer user devices for one or more driver performance metrics associated with one or more driving events performed by the driver (subject driver) who is driving a target vehicle.

In an embodiment, driving events may include, but not limited to the states of a vehicle within a predetermined time period or within a predetermined distance related to normal navigation, maneuvering of a vehicle, turning of a vehicle, stopping of vehicle, stationary vehicle (parked vehicle and stopped vehicle) and the like. Non-limiting examples of driving events may include, but not limited to turning at a junction, changing lane, braking, accelerating, stopping at a red light signal, waiting at a red light signal, start driving when the red traffic signal turns to green, and any maneuvers performed by a subject driver during driving. Driving events may also include any events related to a stationary vehicle such as a parked or stopped vehicle, for example, where a target vehicle is parked, an expired parking ticket, how it is parked, how long it is parked, where it is stopped, and the like. In an alternative embodiment, a driving event may be an action of a subject driver that may affect or be interesting to other road users, such as giving way to pedestrians/bicyclists, giving way to merging traffic, and the like.

Driver performance messages may be a signal/message sent to a subject driver of a vehicle (target vehicle) related to his/her driving quality or for a driving event. In an embodiment, the driver performance messages may be sent by a user (observer user) with a correctly configured device (observer user device). The driver performance messages include, but not limited to star rating, percentage rating, alert, warning, caution, notification and the like. In a non-limiting example, a star rating may be sent to a subject driver for not maintaining a target vehicle within the lane markings or maintaining correct speed while driving a target vehicle. In another non-limiting example, an alert may be sent for one of unintentionally crossing lane, not checking blind spot when turning or changing lane, not noticing the change of traffic light signal from red to green and the like. In yet another non-limiting example, a warning may be sent to a subject driver, if he/she drives over the speed limit where there is a traffic camera, presence of police, and the like. In a further non-limiting example, a caution may be sent to a subject driver for driving too fast on a slippery road, sharp corner and the like. In a further non-limiting example, a notification may be sent to a subject driver if the target vehicle has a defective light, fluid leakage, traffic congestion and the like.

In this document, a user who sends one or more driver performance messages is also referred as "observer user" and the user device of the observer user from which the driver performance message is sent is referred as "observer user device". The driver to whom a driver performance message is intended or the driver whose driving performance is determined/assessed is also referred as "subject driver". The vehicle driven by the subject driver is referred as "target vehicle". The use of the term "instant" means reasonably quick, for example, in less than 30 seconds, more preferably, less than 5 seconds.

In reference to FIG. 1, the system includes a rating application program running on user devices 102, a communication network 104 to transmit and receive data (non-limiting examples include driver performance messages, feedback messages, and coaching related data), a first computer server system (rating server 106) for providing instant and/or aggregate feedback message based at least on the received driver performance messages and a second computer server system (coaching server 108) for providing coaching to the subject driver based at least on the received driver performance messages. Driver performance of a subject driver may be assessed based at least on the received driver performance messages by calculating integral rating and/or driver performance score.

The phrases "driver performance" and "driving quality" are interchangeably used to mean how good the subject driver (person or a computer system) is in operating a target vehicle according to road rules, good driving practices or acceptable vehicle operating practices.

A plurality of users may send driver performance messages by interacting with their devices (observer user devices), for at least one driving event performed by a subject driver wherein, the driver performance message may be provided against at least one driver performance metric. A user may include a person who has access to a device (user device) on which rating program is installed and correctly configured to allow the user to send driver performance messages to a subject driver and receive rating, feedback message(s), and/or coaching based on his/her own driving performance. In an embodiment, a computer system that drives a driverless vehicle may also be a user. In this case, driver performance messages may be provided to a driverless vehicle (non-limiting examples include completely autonomous vehicles, partially autonomous vehicles, remotely operated vehicles, a robot, and the like) to indicate the performance of the driving system in performing different driving events or driving maneuvers.

The driver performance message sent by a user (observer user) related to a subject driver is transmitted through communication network 104 to rating server 106 for determining whether an instant feedback message is required for the subject driver in response to at least one driver performance message. If the received driver performance message requires instant feedback message to dynamically adjust driving behavior, the system (driver performance rating system) sends an instant feedback message to the appropriate user device in the target vehicle to be presented to the subject driver. In an embodiment, the rating server system may determine an integral rating, an aggregate feedback message, a driver performance score, a driver performance report, and other data to send to the subject driver via the user device in the target vehicle or to an appropriate entity. Rating server system 106 may also store these data with a time stamp in a database (not shown) or other appropriate storage system (not shown). These data may also be sent to coaching server 108 for providing coaching to the subject driver to whom the driver performance messages were provided. Coaching may be provided based at least on the comparison of a driver performance score and/or at least one element of integral rating with appropriate predetermined thresholds. It will be appreciated that the two server systems (rating server 106 and coaching server 108) may be integrated and implemented as a single server system or multiple server systems. In another embodiment, the processing may be shared between the two server systems (rating server 106 and coaching server 108) or with the user devices 102.

In a preferred embodiment, when a user device is registered with the system, the user (subject driver) may also enter one or more of the following data including, but not limited to, make of the vehicle, model, color, registration number, photo of the vehicle, and other information of the vehicle that may be useful to identify a target vehicle for an observer user. The subject driver may also enter his/her details including, but not limited to, name, address, phone number, driver license number and other appropriate details. A user may enter the details of the vehicle if he/she changes vehicle. It is also possible for the system to identify the details of the vehicle from the control computer of the vehicle, a proximity sensor, such as, but not limited to one or more of the following: photo/video camera, infrared camera, multispectral/hyper-spectral camera, LIDAR, radio communication device, other appropriate devices sense appropriate wavelength range of electromagnetic spectrum, and any other sensing system known to a person of ordinary skill in the relevant art. These proximity sensors may be built-in sensors in a user device, externally connected via an interface, fitted on the vehicles, in the environment, and any other appropriate location. The system may assign identification number to each vehicle and/or user (driver) to uniquely identify each vehicle and/or user. The observer user device may also utilize image and/or text recognition programming to assist in the identification of a target vehicle. In another embodiment, the observer user device may obtain the identification of the subject driver and/or the target vehicle through a radio communication with a user device in the target vehicle or rating server system 106.

When a driver (subject driver) drives a target vehicle with a user device, the user device may send one or more of the following data in a predetermined time interval: location, lane (traffic lane), speed, acceleration, amount of brake applied, whether an indicator light is on, whether brake light is on, any other appropriate data about the target vehicle state or about the subsystems of the vehicle and the like. When an observer user sends a driver performance message to a subject driver, the observer user device may send one or more from a list including location of the event, location of the user at the time of the event, time of the event, time of sending the driver performance message, sender's identification, identification of the subject driver, identification of the target vehicle, type of driver performance message (for example: star rating, alert, warning, caution, notification, and the like), value or content of the message, driving event for which the message is sent, other data about the driving event, driver performance metric for which the message is sent, type of the target vehicle, target vehicle driving data, evidence for the driver performance message, how long the traffic violation (driving event) lasted, by how much or percentage the violation exceeded relative to a predetermined threshold, other appropriate data related to the driver performance message, and any combination thereof.

In another preferred embodiment, the system may process the received data from an observer user device to determine whether an instant feedback message is required for the intended subject driver, and if yes, the system sends a feedback message to the subject driver. In a non-limiting example, the system may request appropriate data from the device used by the subject driver, or from the observer user device (the device used by the user/observer user to send the driver performance message) to verify the received driver performance message. The data obtained from subject driver's user device may include, but not limited to one or more of the following: target vehicle driving data, environment data, driver state, and other data that may be useful to verify a driver performance message. The target vehicle driving data may be obtained from control computer in the target vehicle, proximity sensors in the user device or on the target vehicle, target vehicle subsystems data and the like, where proximity sensors may include, but are not limited to speedometer, accelerometer, camera, inertial navigation system, vehicle monitoring sensors, and other sensors that may be useful to obtain vehicle driving data known to a person of ordinary skill in the relevant art. The data from an observer user device may include, but are not limited to evidence related to the driver performance message.

The location of a device may be obtained from a global positioning system, inertial navigation system, map matching, dead reckoning, image/video based localization, and other state of the art location system known to a person of ordinary skill in the art. Current lane may be identified from the location and appropriate road map or by using a camera system or other appropriate sensing system. Speed and acceleration may be obtained from a speedometer and accelerometer, respectively. Amount of acceleration and brake applied may be obtained by measuring the amount of pressure applied on the acceleration pad or brake pad, respectively. The state of the indicator light or other subsystems may be obtained from a control computer of a vehicle. Current time may be obtained from the clock in the user device, or from the vehicle computer or by some other means. Identifications of the sender (observer user) of a driver performance message and subject driver may be obtained from the respective user devices, or from a database that stores the user data, vehicle data, and other appropriate data for the correct operation of the driver performance rating system. The type of driver performance message and the value or content of the message may be obtained from the user input, or from proximity sensor measurements. The data related to a driving event may be obtained from user input, or by analyzing the state of the vehicle at the time and/or location when the driver performance message is received.

Evidence for a driver performance message may be one or more from a list including, but not limited to image, video, radar data, LIDAR data, satellite data, location, speed, acceleration/deceleration, distance, radio communication data, and other appropriate data. How long a traffic violation (driving event) lasted, and by how much the violation exceeded a predetermined threshold, may be determined from user input, proximity sensor measurements or other appropriate method. In a non-limiting example, if a driver's speed exceeds the speed limit, the speedometer reading and current time recorded at appropriate time interval may be used to calculate the percentage exceeded and how long it lasted.

In an embodiment of the invention, the driver performance message may include, but not limited to alert, warning, caution, notification, rating, percentage score and the like. The rating may be given in different ways including, but not limited to star rating, color scale rating, percentage score and the like. In a non-limiting example, in the star rating, 0 star may mean poor driving and 5 stars may mean excellent driving quality; in the color scale rating, green may mean excellent driving and red may mean poor driving quality (in-between colors such as orange, yellow and other appropriate colors may mean appropriate driving qualities). In a percentage score, 0% may mean poor driving quality and 100% may mean excellent driving quality. However, other forms of driver performance messages including, but not limited to alert, warning and caution may also be implemented appropriately in assessing the performance of a subject driver. In a non-limiting example, while waiting at a traffic light signal, an observer may send an alert if a subject driver ahead has not noticed the change of traffic light signal from red to green. This alert may be instantly presented to the intended driver (subject driver) in a form including, but not limited to visual display, sound, vibration, and the like. This alert may be appropriately incorporated when calculating driver performance score, integral rating and/or for assessing performance of the subject driver.

A driver performance message may be sent by an observer user (non-limiting examples: driver, passenger, pedestrian, and other users) to another user-subject driver (non-limiting example: a human driver or computer) related to a driving event. These driver performance messages may be sent by an observer user to a subject driver when the subject driver breaks the road rules, do not follow good driving practices, pose a potential hazard to road users or any driving event performed by a subject driver that may affect a road user in some way. Road rules and good driving practices may depend on the region, state, territory or country. The good driving practice is a driving behavior which is generally considered as good by many road users, non-limiting examples include allowing merging traffic, causing minimal/no disruption to smooth traffic flow when performing a driving event and the like. The driver performance message may also be sent to a subject driver in appreciation of following good driving behavior. For example, if a subject driver allows merging traffic without causing any difficulty to other road users, allowing a vehicle to change lanes when the lane on which the other vehicle moving ends or for other reasons. In this non-limiting example, the observer user may give 5 stars to an appropriate driver performance metric in a star rating, or 100% in a percentage score. This rating may be processed when assessing performance of a subject driver or when calculating the driver performance score and/or integral rating. These driver performance messages may be aggregated appropriately to calculate the driver performance score that represents the quality of driving of a subject driver. The system may create a driver profile for each driver based on the received driver performance messages, driver performance score, integral rating, other driving related data and any combination thereof. The driver profile may include history of received driver performance messages, variation of driver performance score, and other data representing normal driving behavior of a subject driver. The driver profile with other appropriate data may be stored in a database or other appropriate storage system. The system may perform one of flagging in the driver profile of the subject driver with a negative rating if the driver performance score of the subject driver goes below a predetermined threshold and flagging in the driver profile of the subject driver with a positive rating if the driver performance score goes above a predetermined threshold.

In a non-limiting example, a star rating or percentage score may be provided to a subject driver for driving events including, but not limited to driving too slow in a lane intended for fast moving vehicles, changing lanes frequently, not maintaining the correct distance to the vehicle ahead, applying hard braking/acceleration many times unnecessarily, and the like. In another non-limiting example, if a subject driver follows too close with the vehicle ahead, a user (observer user) may send 3 stars (out of 5 stars) to the subject driver corresponding to driver performance metric "maintaining safe distance" by appropriately interacting with a rating application.

In another non-limiting example, an observer user may send an alert to a subject driver if the driver has not noticed the change of traffic light from red to green while waiting for a traffic signal at an intersection. An alert may also be provided for driving events including, but not limited to, not checking blind spot when changing lane/when turning, unintentionally leaving lane, imminent accident, or posing hazard to other road users. An alert may also be given if a subject driver loses control of the target vehicle due to fatigue or distraction. These alert messages may be processed by the system to provide an instant feedback message to the subject driver and incorporated when calculating the driver performance score and/or integral rating.

In yet another non-limiting example, a warning may be provided by a user for a driving event including, but not limited to driving too fast when approaching speed camera or speed enforcement system, driving too fast in a school zone or high pedestrian activity area, driving in the wrong direction in a road or breaking road rules.

In a further non-limiting example, caution may be provided for driving events including, but not limited to a subject driver driving too fast on a slippery road, wet road, icy road, at sharp bend, on a steep road, or driving too fast on a road segment where there are speed bumps. In a preferred embodiment, the different driver performance messages may be processed and an instant feedback message may be provided if required. Further, these driver performance messages may be appropriately converted to a common scale (non-limiting examples are star rating: 0 to 5 stars, percentage score: 0 to 100%) to determine a driver performance score and/or integral rating.

In an embodiment, the driver performance score and integral rating may be calculated in one of many different ways by appropriately combining the driver performance messages received for a plurality of driver performance metrics from a plurality of observer user devices. The method of combining different driver performance messages may depend on a number of factors including, but not limited to an application for which the driver performance is assessed, group of users for whom a rank is calculated, company for which the driver performance is assessed, number of times the same type of driver performance messages received for a subject driver within a predetermined time period, type of driver performance metric for which the driver performance message is received, credibility of the user (observer user) who sent the driver performance message, history of the observer user from whom the driver performance message was received, and any combination thereof. In another embodiment, the driver performance score may be calculated by counting the total number of driver performance messages received within a predetermined time period and calculating the inverse of that total number. In this case the driver performance score varies between 0 and 1. If there are no driver performance messages received during the predetermined time period a count of one may be added to make the driver performance score to be within 0 and 1. In yet another embodiment, the driver performance score may be calculated by counting the total number of driver performance messages received within a predetermined time period where the equivalent star rating of the driver performance message is between predetermined thresholds in a star rating scale or any other appropriate scale and calculating the inverse of that total number of messages. If the total number is zero, a count of one may be added to make the driver performance score be within 0 and 1. In a non-limiting example, if a subject driver received 100 driver performance messages with an equivalent star rating between 0 and 2 stars, the driver performance score will be 0.01. In a further exemplary embodiment, the driver performance score may start with a predetermined reference value and every time a driver performance message is received, depending on the equivalent star rating of the driver performance message, the driver performance score may be varied. In the same non-limiting example, the driver performance score may reduce by relatively a large amount when a subject driver receives a driver performance message equivalent to 2 stars than a message equivalent to 3 stars (in a 5 stars rating scale).

In an embodiment, to calculate the driver performance score, the method may convert all the driver performance messages to a common rating scale (non limiting example star rating) and calculate the statistical mean or any other appropriate statistical values. In a non-limiting example the, method may normalize the calculated driver performance score with total distance driven by the subject driver. In another non-limiting example, the method may provide confidence on the calculated driver performance score based on the standard deviation calculated on the driver performance messages and/or the distance or hours driven. Confidence on the calculated driver performance score may also be provided by calculating appropriate statistical values including, but not limited to variance, entropy, and standard error.

In an alternative embodiment, the driver performance score may be calculated as a weighted sum of driver performance messages received for different driver performance metrics during a predetermined time period. In an alternative embodiment, the weights used to combine driver performance messages associated to different driver performance metrics may be customized for a group of users when calculating a driver performance score and/or integral rating for assessing driver performance.

Driver performance messages may be converted to equivalent star rating depending on the type of driver performance message, driver performance metric, driving event, credibility of the observer user, any valid evidence available for the received driver performance message, individual differences between observer users in providing driver performance messages, and any combination thereof.

In a preferred embodiment, by way of example only, the integral rating may be determined by counting the driver performance messages that are between predetermined thresholds in a star rating scale for each driver performance metric, and calculate the inverse of the total count of messages for each driver performance metric (add count of one if there are no messages received for a driver performance metric). In another embodiment, certain driver performance metrics may be combined into one metric depending on the application for which the integral rating is calculated. In another embodiment, the calculations of the integral rating involve counting the number of alerts, warnings, and notifications separately as the inverse of each of the totals. For determining a star rating, calculate the mean and variance of star ratings received during a predetermined time period. In yet another embodiment, to calculate integral rating, the total number of driver performance messages for each driver performance metrics that are between two predetermined values in star rating scale may be normalized by the distance driven, or the number of hours driven by the subject driver. In a non-limiting example, an element of integral rating may be calculated by converting all the received driver performance messages for maintaining the target vehicle within lane markings during a predetermined time period to equivalent star rating and counting only the messages as those are between 0 to 2 stars. Then calculate the inverse of the count (add 1 if the count is zero). In another embodiment, the count of the driver performance messages may be divided by the total number of kilometers driven during the predetermined time period or total number of hours driven by the subject driver within that time period. Similarly, the other elements of integral rating may be calculated for other driver performance metrics. An element of the integral rating may represent the driver performance messages received for one driver performance metric or more than one driver performance metric.

In an embodiment, the performance of a subject driver may be assessed by comparing the driver performance score or integral rating with an experienced driver or a standard driver. The experienced driver or standard driver may include, but is not limited to a driver with no traffic-related offences for a predetermined time period, a driver with predetermined number of years of driving experience (non-limiting example: 5 or 10 years of driving experience), a driving instructor, or a hypothetical driver with driving performance equivalent to the statistical mean driving performance of predetermined number of drivers who have predetermined number of years of driving experience with predetermined age range.

In a non-limiting example, if an alert is received for a subject driver for leaving the lane (traffic lane) unintentionally or for not noticing the change of a traffic light from red to green while waiting at a traffic light stop, an instant feedback message may be provided to the subject driver. An aggregate feedback message may also be provided at a later time depending on a number of factors including cognitive load (or driver state) of the subject driver (measured with body sensors, video camera, and other appropriate sensors), location, time and the metric for which the driver performance message was received. For subject drivers where the integral rating calculated during a predetermined time period for one or more driver performance metric is below a predetermined threshold, the subject driver may be provided suggestions or recommended coaching to improve driving quality.

In an embodiment of the invention, the subject drivers with a driver performance score or integral rating below a predetermined threshold may be given coaching, compulsory driver training or retake a driving test, or even banned from driving. For example, a subject driver with foreign driver license with a driver performance score or integral rating below a predetermined threshold may be required to receive coaching for a certain number of hours, and/or required to take a driving test. For subject drivers of a certain age range (non-limiting example: drivers above 70 years of age and/or below 20 years of age) may be required to maintain a certain integral rating and/or driver performance score to be able to continue to drive. If the driver performance score goes below a predetermined threshold, the subject driver and/or the authority may be notified. This may be useful to test the elderly or teenage driver for their ability to drive certain types of vehicles.

In an embodiment of the invention, drivers may require maintaining a predetermined integral rating for each driver performance metric (or each element of the integral rating), and/or driver performance score to be allowed to drive in certain types of roads, certain geographical areas, certain time of day and the like.

In another embodiment of the invention, a user (observer user) who rates a subject driver for the driving performance may also give suggestions on how to correct such mistakes or how to improve driving quality, or even where to find resources to learn/get training to improve driving quality. In an embodiment, coaching server system 108 may provide coaching materials to improve driving quality. The server system may also suggest a list of driving instructors in the local region to provide the necessary coaching or mentoring.

In a non-limiting example, if the target vehicle crosses the lane marking due to lack of control by the subject driver, an observer user may send an alert to be presented to the subject driver instantly. However, if the target vehicle does not cross the lane markings, but the wheels are on the lane markings, or close to one of the lane marking most of the time, then an observer user may give a star rating (for example: 4 stars) to the subject driver corresponding to the driver performance metric "drive within lane". The observer user may also write comments related to the rating (a non-limiting example comment may be "vehicle is always on or close to the right hand side lane marking. Try to maintain the vehicle in the middle of the lane for safety reasons"). The observer user may also add a photo or video, or some other form of evidence in support of the driver performance message.

In an embodiment of the invention, the system may present the processed driver performance messages and relevant data sent by an observer user to a subject driver at the end of journey or at a time as preferred by the subject driver or a third party. The user may review the rating that he/she received and reject the messages if they are not correct. If a subject driver disputes a received driver performance message, he/she may present evidence in support of the dispute. The system may appropriately process the evidence.

Depending on the type of driver performance message, the history of the user who sent the message, and emergency, the message may be delivered directly to the intended subject driver or through rating server 106. In a non-limiting example, if the user who provided the driver performance message is not reliable (for example, has sent incorrect messages to drivers in the past) the alert may be sent to rating server 106 to be processed before presenting it to the intended subject driver. Rating server 106 may allow a message to be presented to the subject driver or prevent the message from being presented to the subject driver depending on a number of factors including, but not limited to location, time, credibility of the observer user, type of message, and the like. For example, an alert message sent for not noticing the change of a traffic signal from red to green in a road segment where there is no traffic signal (non-limiting example: on a motor way), the alert signal may be blocked by rating server 106.

Assessing the performance of a subject driver may include, but is not limited to analyzing the driver performance messages received for a plurality of driver performance metrics during a predetermined time period, variation of driver performance scores over a predetermined time period or predetermined distance travelled, variation of an integral rating over a predetermined time period or predetermined distance travelled, and any traffic-related offences committed by the subject driver. In an embodiment, assessment of a driver's performance may also include, but is not limited to assessing the driver performance messages received for different speed, different time of day, different traffic conditions, different types of road, different road conditions, different environmental conditions, different geographic locations, and any combination thereof. These comprehensive performance assessments may be used to assess the performance of an autonomous driving system to improve the performance of the driving computer program, algorithm, computer processor, and the like. It is also possible to use this driver performance rating system for assessing the performance of a human driver or other systems that operate vehicles/machines of any category.

In an embodiment, the subject driver and/or a third party may be able to view the driver performance report produced by the system. In a non-limiting example, the report may include, but is not limited to the density of received driver performance messages appropriately color-coded based on the number of received messages with time/geographic location.

In another non-limiting example, the report may include the variation of received driver performance messages, driver performance score, and/or integral rating with time of day, geographic region, type of road, traffic condition, and the like. Any traffic-related offences may be obtained from a police data base or other information source and appropriately weighted when calculating the driver performance score and/or integral rating.

In an embodiment, a driver performance message may be any piece of information (non-limiting example: message about traffic congestion, accident, road closure, and road condition such as icy road) sent by an observer user or by other sources that may be useful to one or more users including subject drivers. In an embodiment, depending on the application, the messages sent to a subject driver related to general information about traffic congestion, accident, road closure, slippery or icy road condition, police presence, speed camera and the like may not be taken into account when calculating the driver performance score of a subject driver, integral rating or assessing driver performance.

In an embodiment, users may inform other users of any black spots, hazardous areas, and any other traffic-related information that may be useful to a subject driver. A black spot may include, but is not limited to difficult "T" junctions where geometry of the junction makes it difficult to see any approaching vehicles or vehicles parked on the road side may make it difficult to get a clear view of any approaching vehicles when getting onto a road. Other examples of a black spot may include a sharp bend in a road where there are no lane markings or a narrow segment of road, steep zigzag road, a junction at a high ground and the like. Any other information that may be useful to a subject driver including, but not limited to information about children playing on road side, animals crossing a road, lane closure, accident, traffic congestion, and the like.

In an embodiment, if a target vehicle is stopped/parked in a prohibited area or parked incorrectly may be given an appropriate driver performance message by an observer user by entering the vehicle registration number or any other identification. The observer user may also take a photo or video or any other form of evidence to support the driver performance message. Rating server 106 may identify the subject driver from an appropriate database and notify the subject driver and incorporate the message into the calculation of driver performance score and/or integral rating for the subject driver.

In an embodiment, subject drivers may be ranked based at least on driver performance score and/or integral rating received over a predetermined time period. A subject driver may also be ranked based at least on the driver performance messages received during a predetermined time period among a group of users. The group of users may include, but are not limited to drivers working for a company, friends, family members, members in a local community, learners of a driving instructor and the like.

In an embodiment of the invention, a user may be able to view how his/her driving performance varies with time and/or other appropriate factors such as geographic location, region, and type of road. In addition, the subject driver may also able to see on what aspect of driving he/she needs to concentrate to improve the driving performance further.

In an embodiment, a subject driver may be informed if a fellow driver (driver in a vehicle ahead or driving in an adjacent lane) is not good at any driving aspect based on their integral rating. A driving aspect may include, but is not limited to maintaining the vehicle within lane markings, correctly indicating, maintaining enough of a gap to the vehicle ahead, and the like. In a non-limiting example, if a driver ahead of a first vehicle applies hard braking or a driver in an adjacent lane is not good at maintaining the vehicle within the lane markings based on the past history of driver performance messages, the driver of the first vehicle may be appropriately informed.

In an embodiment, the driver performance score and/or one or more elements of integral rating of a subject driver may be displayed along with the displayed icon of the target vehicle or indicate what precautions need to be taken by other drivers who drive close to that target vehicle. An element of the integral rating may include driver performance metrics along with scores representing the driver performance messages received during a predetermined time. In a non-limiting example, the score may be a statistical value representing the received driver performance messages after converting to equivalent star rating.

In an embodiment, each target vehicle and/or the subject driver may be given an identification number (ID) and displayed next to the icon representing the vehicle on the display screen of a user device.

In another embodiment, the user interface may be designed such that, it is easy to interact with the rating application with no distraction or minimal distraction for a driver of a vehicle or an observer user when sending driver performance messages to subject drivers. In a non-limiting example, a driver performance message may be generated by one or more methods of interaction including voice input, hand/face gesture, touch screen (smart screen), keyboard and the like. For example, an observer user may say the following to send a driver performance message (star rating) to a subject driver: "vehicle with ID 5, give 4 stars for maintaining vehicle within lane markings". This may be interpreted either at the user device, server system or other computer system by applying a voice recognition system. The above input may be interpreted as a 4 stars rating to the subject driver of the vehicle with ID 5. The system may appropriately process the interpreted data and determine whether the subject driver requires an instant feedback message, and whether to include it in a calculation of a driver performance score and/or integral rating for the subject driver. In an embodiment, a subject driver who receives driver performance message may not be aware of the identity of the observer user who sent the driver performance message.

In an embodiment, some of the features (non-limiting example: alert, warning or caution for certain driver performance metrics) may be automatically made visible depending on factors including, but not limited to, current location, current time, type of road, neighboring vehicles (subject drivers), and weather condition. This is to make the user interaction with the rating application program easy. In a non-limiting example, if the outside temperature is low and there is possibility of a snowy or icy road surface learned from a source of information (such as the Internet) including weather forecast, the appropriate interface that allows sending a caution for icy road may be displayed or enabled to be on the top of the list of features. In another non-limiting example, while waiting for a green light signal, the appropriate interface to send an alert message for not noticing the change of traffic light from red to green may be displayed. In yet another non-limiting example, when approaching a road segment where a time-dependent speed restriction applies (non-limiting example: school zone), the corresponding feature in the rating application program may be displayed to make the user interaction easy. A pattern recognition algorithm/machine learning algorithm (non-limiting examples: Bayesian approach, artificial neural network) may be used to select appropriate features/screens to display on the display device to minimize distraction to a user. The rating features to display on the screen may also depend on the integral rating of the neighboring drivers. For example, if a subject driver in the neighboring lane is not good at maintaining the target vehicle within lane markings, the appropriate interface to send a driver performance message may be made visible or displayed at the top of the display device to make the user input easy when sending a driver performance message.

In an embodiment, if a user has more than one device, the rating application may be installed in multiple devices with the same user identity (same user details) and the user may choose to use one of the devices while driving. In another embodiment, the identity of a user installing the rating application program in more than one device may be verified with a combination of details including, but not limited to full name, date of birth, address, license number, vehicle registration number, e-mail address, telephone number, and the like.

In another embodiment, if a subject driver does not have the rating application program installed, or the rating application program is not currently running in the user device while driving, an observer user may use the vehicle registration number or any other identification to send driver performance messages for one or more driving events performed by the subject driver. The system may identify the correct subject driver from a database (stores user and vehicle data), from the owner of the target vehicle or by some other means to associate the driver performance messages. In a non-limiting example, vehicle number plate recognition system may be used to find the identity of the target vehicle and to find the subject driver to correctly associate driver performance messages. In an alternative embodiment, the driver performance messages may be associated with the target vehicle if a subject driver cannot be correctly identified by the system. In another embodiment, for a driverless vehicle, the driver performance messages may be associated with the target vehicle, vehicle brand, manufacturer of the vehicle, computer system that drives the vehicle, or any other appropriate entity.

In another embodiment, if there are more than one user in a target vehicle (non-limiting example: driver and passengers travelling in a vehicle with devices), one of the users may be declared as the subject driver and the others become passengers. Any driver performance messages provided for any driving event related to that target vehicle is associated with the subject driver of the target vehicle. If there is not any user declared as the subject driver in a target vehicle, the driver performance rating system may ask each user with a device travelling in the target vehicle to find the subject driver. In an embodiment, the system may ask certain users in the target vehicle based on a past role (who was the subject driver and who were the passengers) to determine the subject driver instead of asking every user travelling in the target vehicle. If there is more than one subject driver role entered by more than one user device, the system may ask each one to find the correct subject driver.

In an embodiment, if a target vehicle is shared by a group of people (non-limiting example: vehicle shared by members of a family or vehicle shared by workers in a company), one of the users may be indicated to be the subject driver, or the system may ask each user travelling in the vehicle to identify the subject driver. The system may also apply appropriate pattern recognition/machine learning algorithm (non-limiting examples: Bayesian algorithm, maximum likelihood algorithm, artificial neural network system or any other recognition algorithm) to find the user based on the past history of data. For example, a pattern recognition algorithm may be trained using the following list of information from the past driving data including, but not limited to, day of driving, time of driving, route taken, driving speed, driving behavior, driving maneuvers, settings in the vehicle including side mirror, height of the driver, type of music played, and any combination thereof to identify the correct subject driver.

In an embodiment, the user who drives a vehicle may be identified with an appropriate recognition system including, but not limited to facial recognition, fingerprint recognition, voice recognition, and any other biometric identification system.

In another embodiment, the subject driver (or user device or the vehicle) may be identified based on radio communication, radio frequency-based identification, or other sensor devices including a camera that may capture visible spectrum or infrared waves or any other range of wavelengths in the electromagnetic spectrum. A non-limiting example includes radio frequency identification (RFID). In an embodiment, users, user devices, and vehicles may be given identifiers to identify each of them uniquely.

In an embodiment of the invention, a driver performance message received while driving may be presented to the subject driver at the end of the trip, or at a later time. The user may be able to view the details of each driver performance message including the location, time, driver performance metrics for which the messages were received, any relevant information of the driving events, any evidence, and any combination thereof.

In an embodiment of the invention, the driver performance score may be calculated as a percentage score, star rating or any other appropriate form by combining a driver performance message received for different driver performance metrics from a plurality of observer users. In a non-limiting example, the driver performance score and/or integral rating may be presented as percentage score or color-coded as follows: driver performance score between 00 to 20 may mean very poor quality of driving (may be presented with red), driver performance score between 20 to 40 may mean poor quality of driving (may be presented with orange), driver performance score between 40 to 60 may mean fair quality of driving (may be presented with yellow), and so on.

In another non-limiting example, the variation of driving performance over time may also be presented in a table, line graph, bar chart, pie chart or any other user preferred format. A user may customize the presentation of the integral rating and/or driver performance score for a predetermined time period or predetermined distance travelled or predetermined geographic region.

In an embodiment of the invention, a driver performance score may be normalized. Non-limiting example methods of normalization include, but are not limited to normalizing to be in between 0 to 1, or 0 to 100, or another user preferred range. In another non-limiting example, the driver performance score may be normalized within each road segment travelled, per 100 km (kilometers) driven by the subject driver, per 10 hours driven by the subject driver, type of road, time of day, traffic condition, geographic location, traffic zone, relative to an experienced driver of 5 or 10 years of driving experience and the like.

FIG. 1a illustrates a schematic diagram of a driver performance rating system in accordance with an embodiment of the invention. In an embodiment, the driver performance rating system may include user devices 102a and 102b, a rating server system 106, a coaching server system 108, and a communication network 104. Two drivers (users) 114a and 114b are driving vehicles 112a and 112b, respectively. The users 114a and 114b have access to user devices 102a and 102b respectively (the user devices may be any appropriate computing devices). Proximity sensors 110a to 110f are fitted on the vehicles to identify neighbor vehicles and/or monitor vehicles to identify any driving event requiring sending a driver performance message to a subject driver. In another embodiment, additional proximity sensors may be used such as sensors built-in the user device (not shown), other sensors appropriately fitted in other places on the vehicle (not shown), and/or sensor devices appropriately fitted in the environment (not shown) may also be used for performing tasks including, but not limited to identify vehicles, identify users including subject drivers, monitor vehicles, monitor subject drivers, identify driving events, verify driver performance messages sent by observer users, monitor the environment, monitor the road conditions, localization of vehicles/devices, recognizing road markings, recognizing information on the road signs, identify any traffic-related restrictions, other data collection for the operation of the driver performance rating system, and any combination thereof. The system may apply appropriate pattern recognition or machine learning approaches to perform one or more of the above listed tasks.

In the user devices 102a and 102b an application program (or computer application program or rating application program) may be running to allow an observer user to send driver performance messages (including, but not limited to relevant data such as location, time, type of message, identity of the observer user, identity of the target vehicle, driving event, evidence, comments, and any combination thereof) to the server systems (106 and 108) via the communication network 104, receive feedback messages for driver performance messages provided by other users (observer users), coaching, and other information. The rating application program provides the necessary user interface for a user to interact with the system to send driver performance messages to one or more subject drivers and receive feedback messages on his/her driving performance. A user device may also be connected to proximity sensor devices. In an alternative embodiment, the user devices may directly communicate to each other to send driver performance messages related to driving maneuvers, and receive feedback messages and coaching. A user device may include, but is not limited to a smart phone, tablet, computer, portable device, navigation device or the built-in computer system in a vehicle.

In a preferred embodiment, the users (observer users) who may provide driver performance message(s) include, but are not limited to people travelling in a private vehicle, public transport, shared transport, motorcycle, bicycle, and pedestrians. A user (subject driver) who may receive including driver performance message(s), feedback message(s) and/or coaching may include, but are not limited to a driver (subject driver) of a vehicle, including a car driver, bus driver, lorry driver, motorcycle rider or any other vehicle operator. In another embodiment, a bicycle rider may also be sent driver performance messages based on the riding quality. It may also be possible to send driver performance messages to driving events performed by an autonomous vehicle. In the latter case, the correct entity (human, computer driving system or other appropriate system) responsible for performing the driving event for which one or more driver performance messages are received may be associated.

The driver performance messages received for an autonomous vehicle driving system may be used to assess the quality of performing different driving maneuvers under different conditions to improve the driving quality of an autonomous driving system by dynamically learning to adjust the appropriate calibration factor(s) of the driving system. In particular, adjusting at least one calibration factor of the driving system of the autonomous vehicle so as to improve driving performance of the autonomous driving system of the vehicle based at least on the aggregate vehicle driving data received from a plurality of observer user devices. In an embodiment, the vehicle driving data may include, but is not limited to one or more of the following: driver performance messages, evidence, state of the target vehicle, data from the control computer of the target vehicle, data from the target vehicle sub-systems and the like. Target vehicle driving data may be obtained from different sources including, but not limited to proximity sensors on the target vehicle, proximity sensors in the environment, proximity sensors in the other vehicles, and the control computer of the target vehicle. In one embodiment rating server 106 or a computer system may analyze the vehicle driving data and dynamically learn to improve the driving performance based on the received data. The system may apply an appropriate pattern recognition or machine learning algorithm (non-limiting examples include an artificial neural network, Bayesian algorithms, and other state of the art algorithms known to a person of ordinary skill in the relevant art) to dynamically improve the driving performance. In an alternative embodiment, it may also be possible for a person or a computer system or other appropriate system to analyze the vehicle driving data, the driver performance messages, and other appropriate data to improve the performance of the driving system. Improving the driving system of an autonomous vehicle (target vehicle) may include, but is not limited to improving the computer processor, improving the computer program that is responsible for the aspects of driving related to the received driver performance messages, improving the appropriate sub-systems of the vehicle, other systems related to driving, and any combination thereof.

In an embodiment, communication network 104 may include one or more from the following list including, but not limited to a wireless communication network (e.g., cellular network such as 3G, 4G and beyond, Wireless-Fidelity (Wi-Fi/IEEE 802.11 standards), WiMAX (IEEE 802.16e standard), and BLUETOOTH) for providing the required data communication between the user devices 102*a* and 102*b*, between the user devices and server systems (rating server 106 and coaching server 108). In another example embodiment, a user device may wirelessly communicate to a base station and the base station may be connected to a core network such as public switch telephone network (PSTN) or other appropriate network. In yet another exemplary embodiment, user devices 102*a* and 102*b* may communicate wirelessly to appropriate Wi-Fi access points and these Wi-Fi access points may be connected to Internet Protocol network (IP network or the Internet or any other appropriate network). In a further embodiment, the network may also include a Local Area Network (LAN), Metropolitan Area Network (MAN), Wide Area Network (WAN), ad-hoc network, peer-to-peer network or any other state of the art communications network that is known to a person of ordinary skill in the relevant art.

In an embodiment, driver performance messages provided by a plurality of users (observer users) are transmitted to rating server 106 where the received driver performance messages for a plurality of driver performance metrics from a plurality of users are appropriately combined to determine the driver performance score and/or integral rating of a subject driver. Rating server 106 may provide instant or aggregate feedback messages to a subject driver based at least on the received driver performance messages. The driver performance messages, driver performance score, integral rating, and other appropriate data are stored by rating server 106 in a database and also sent to coaching server 108. The coaching may be provided by coaching server 108 based at least on the received driver performance messages, integral rating, and/or driver performance score.

In an implementation, the driver performance messages and associated data may be stored in a database server (not shown) collocated with the rating and coaching servers, or remotely located from these servers. The database server may be a computer server system or array of computer server systems appropriately configured to store data. In a non-limiting example, the data may be stored in a form including, but not limited to tables and the database server may respond with the appropriate data for a database query received from the rating server, the coaching server, or other appropriate system. The data may also be stored in other forms or may be stored in other appropriate computer readable storage devices.

Although, rating server 106 and coaching server 108 are shown as separate blocks in FIG. 1*a*, it will be appreciated that these two may be integrated into one server system with required hardware and software components to receive driver performance messages from observer user devices over communication network 104, combine the driver performance messages received for a plurality of driver performance metrics from a plurality of observer users and provide feedback message/coaching to subject drivers based at least on the received driver performance messages. In another embodiment, observer user device may include a correctly configured device to automatically generate driver performance messages to a subject driver for one or more driving events.

In an alternative embodiment, the two server systems (106 and 108) may share the steps illustrated in FIGS. 4 to 8. In another embodiment, some or all of the steps illustrated in FIGS. 4 to 8 may be performed by one or more user devices with or without communicating to server systems. In a further embodiment, some or all of the steps illustrated in FIGS. 4 to 8 may be shared between user devices 102, rating server 106, and coaching server 108, or other systems (such as a roadside access unit and the like).

In an embodiment, the driver performance messages intended for an autonomous vehicle may be associated to the make, model or other appropriate entity of the autonomous vehicle to indicate its quality of driving/operating the vehicle or any other operating features. The driver performance messages received from observer users may be incorporated when designing the next model of the vehicle and/or to improve the performance of existing models of autonomous vehicles.

In an alternative embodiment, the driver performance rating system may be implemented for off-road vehicles, surface vehicles, and other vehicles. In yet another embodiment, the driver performance rating system may be appropriately implemented for non-vehicles, other machines, systems, operators of machines/systems, and any combination thereof. In this case the driver performance messages may be related to the operation of a system/machine or any other feature of the system and the like.

In another embodiment, driver performance messages may be sent by means of an automatic driver performance rating system a computer system connected with appropriate proximity sensor devices (non-limiting examples including: photo/video camera, GPS device, speedometer, accelerometer, inertial navigation system, LIDAR, depth/range sensor, ultrasound sensors, time of flight camera, radar, infrared camera, range determination devices based on radio communication, other sensing devices and any combination thereof) to automatically identify driving events that breaks road rules, poses hazard to other road users or affect other users or objects. The automatic driver performance rating computer system may send driver performance message(s) for one or more driving events performed by a subject driver who drives the vehicle in which the computer system is fitted, or a subject driver who drives a neighboring vehicle (target vehicle). The automatic driver performance rating system may also be fitted in the environment to monitor driving events performed by subject drivers driving a target vehicle to provide a driver performance message.

In a non-limiting example, an automatic driver performance rating system may use an accurate road map with lane marking, current traffic restrictions on the road, and a geo-location system (non-limiting example: GPS or any other localization and/or tracking system), the dimensions of the target vehicle and other information to detect whether a vehicle is maintained within lane markings.

A signal and/or image processing algorithm may be implemented in a computer system to receive and appropriately process proximity the sensor data to identify target vehicles and/or identify driving events to generate driver performance messages automatically. The processing algorithm/method may include, but is not limited to artificial neural network-based methods, hidden Markov models (HMM), Bayesian algorithms, and any other algorithm known to a person of ordinary skill in the relevant art.

In yet another embodiment, proximity sensors and computer system described above for providing automatic driver performance messages may also be used to rate the performance of a subject driver of the vehicle (target vehicle) on which the sensors and the computer system are fitted or any other drivers in the neighboring vehicles.

In a further embodiment, the automatic driver performance rating system may identify the vehicles, identify potential driving events that may require one or more driver performance messages and ask the observer user to verify the message before sending it to the server or other appropriate system.

In an alternative embodiment, any traffic offences committed by a subject driver may be incorporated into the driver performance rating system when calculating driver performance score and/or integral rating. Based on the past traffic-related offences, a subject driver may be warned by the system to avoid similar offences committed again. In a non-limiting example, if a subject driver received penalty for crossing a red light signal, the subject driver may be warned to prevent committing the same offence again.

In another embodiment, if a parking ticket expired for a parked vehicle (target vehicle) or parked in a prohibited area, an observer user may send an alert to the subject driver of the parked vehicle. Rating server system 106 may store the routes taken by a vehicle, start time of parking, location of parking and other relevant data for each vehicle. The system may identify whether a vehicle is parked or not by methods including, but not limited to movement of the vehicle, how long the vehicle is stopped, location where it is stopped, past history of locations of parking and time duration for which the vehicle was parked, whether engine is turned off, using a user device (non-limiting examples: built-in device turned off or turned to sleep mode, change in mode of operation, detection of walking movement from mobile device, mobile device goes out of drivable area, and any combination thereof), or by asking the driver (subject driver) to verify whether the vehicle is parked. From this data and other information, rating server 106 may identify the subject driver of the vehicle and send the driver performance message to the correct subject driver. In a non-limiting example, a user may also enter the registration number of a vehicle to provide a rating or alert.

In a non-limiting example, if an on-duty police officer or a fire brigade sends an alert or a warning or caution message to one or more users/subject drivers in a road segment in response to an emergency situation, the message may be sent immediately to the intended subject drivers/users. In another embodiment these messages may be directly sent to the subject drivers without going through rating server 106 depending at least on the observer user who sent the rating and the message.

In an embodiment, the driver performance rating system may be implemented as central processing server systems to operate as a client-server model with the user devices. The server system may also be a single server system or group of server systems distributed in one or more geographic locations. In another embodiment, the plurality of user devices may be connected wirelessly such that they communicate to each other to provide portions of necessary functions of the server system to provide the functions of rating and coaching servers (106 and 108).

In an embodiment, the server systems (rating server 106 and coaching server 108) may be implemented as a combination of software and hardware configured to perform functions including communicating to user devices 102 and to perform processing on the driver performance message and relevant data to determine driver performance score and/or integral rating, to provide a feedback message and coaching. The server system may store the rating and relevant data received for each user in a computer readable volatile or non-volatile storage medium. The stored historical data may be used to monitor a subject driver's performance over a predetermined time, calculating insurance premium, insurance coverage, calculate a cost of hiring a vehicle, produce driver performance report, generate driver profile, and the like. The integral rating may represent the quality of different aspects of driving of a subject driver including normal driving quality, lowest and highest rated driver performance metrics, and precautions a fellow driver may need to take to avoid any inconvenience or hazard or accidents. Credibility of a user may represent how good a user is in providing driver performance messages to other users (subject drivers), accuracy of the messages provided, normalization required to account for any individual differences in providing driver performance messages and other relevant information about a user for the operation of the driver performance rating system.

Figure 1B:
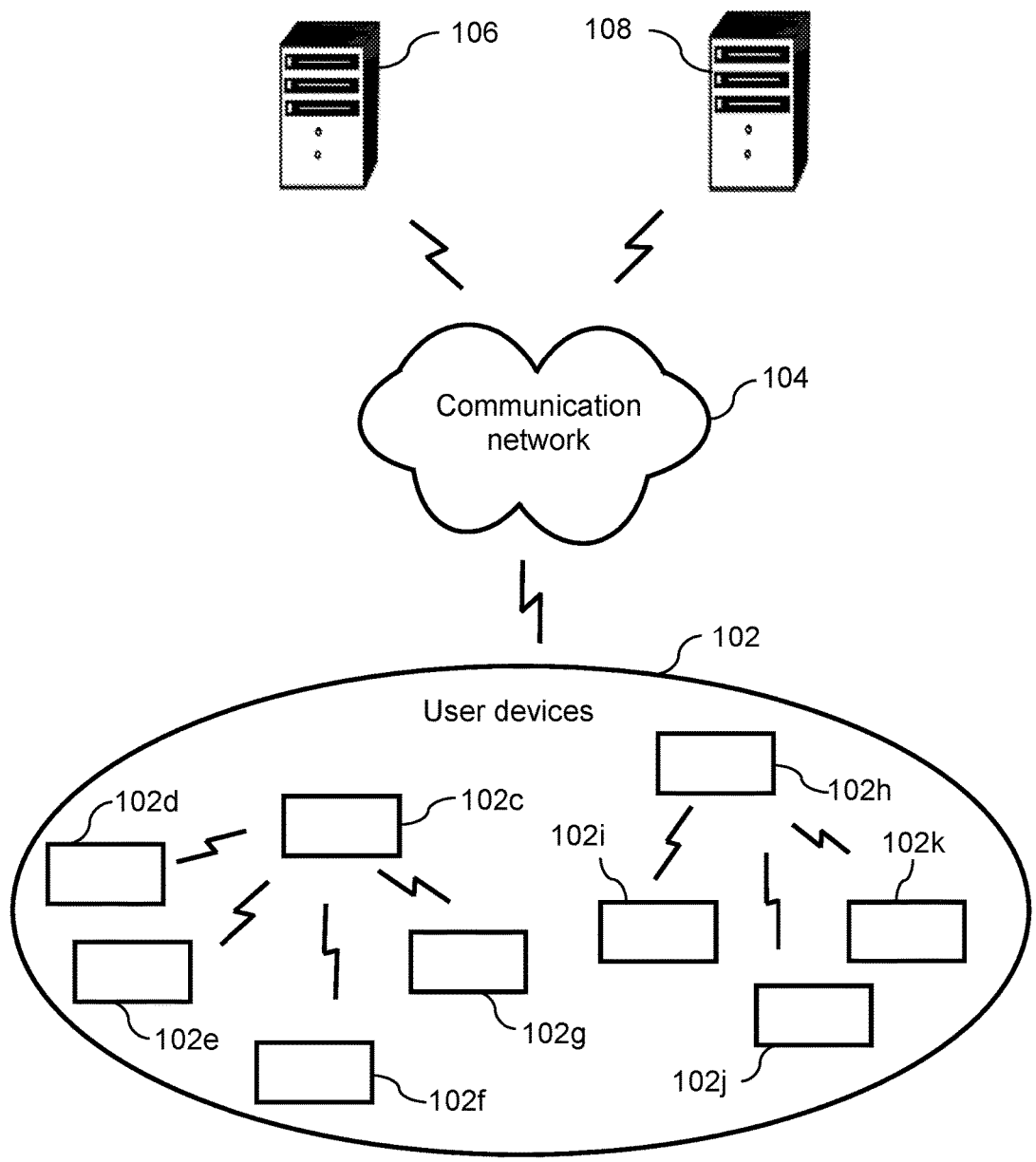
FIG. 1b is a block diagram of a driver performance rating system in which the members communicate to the server systems via clique leaders in accordance with an embodiment of the invention.

FIG. 1b illustrates a schematic diagram of a driver performance rating system according to an embodiment of the invention. Rating server system 106, coaching server system 108 and the communication network 104 are the same as in FIG. 1a. In the system illustrated in FIG. 1a, the user devices communicate directly to server systems through communication network 104. However, the system illustrated in FIG. 1b, the example user devices 102c to 102k communicate through clique leaders. In FIG. 1b, the user devices 102c to 102g form a first clique with device 102c being the leader while user devices 102h to 102k form a second clique with user device 102h being the leader. The user devices (members of the first clique) in the first clique communicate to and from the server systems through the leader 102c, while the user devices (members of the second clique) in the second clique communicate to and from the server systems through the leader 102h.

Formation of a clique depends at least on one or more from the following list including, but not limited to the received signal strength between the leader and the user device, distance between the user device and the clique leader, and the direction of movement of the user device and the clique leader. In a non-limiting example, if the received signal strength from the user device to the leader is above a first predetermined threshold and/or distance from the user device to the leader is below a second predetermined threshold and/or the direction of movement of the clique leader and the user device is the same, the user device may join the clique. If a user device cannot find an appropriate clique to join, it may form a new clique and declare itself as the leader. A user device (observer user device or the device in the target vehicle) may be designated as a clique leader configured to interact with the remote server, the designation being based on a comparison of available processing resources amongst user devices, memory resources, communications resources, and other resources required for the correct operation of the driver performance rating system. In an alternative embodiment, formation of a clique and designation a clique leader may be performed as further described in U.S. application Ser. No. 15/093,761, filed Apr. 8, 2016, the entire contents of which is hereby incorporated by reference herein.

In a non-limiting example, a member 102d sends driver performance message related a subject driver to its clique leader 102c. The communication link between the leader and a member device may include, but is not limited to Wi-Fi, BLUETOOTH, Wi-Fi Direct, any other peer-to-peer communication link, cellular communication, and other wireless communication system known to a person of ordinary skill in the relevant art. In a non-limiting example, the leader 102c may process the received data to remove any redundant data or any data that server system 106 already received (this is to minimize the amount of data transmission and to increase system efficiency), and sends the data to rating server system 106 via communication network 104. Server system 106 may also receive driver performance messages from observer user devices in other cliques via their respective leaders. Rating server 106 may determine whether an instant feedback message is required in response to one or more driver performance messages, and if yes, rating server 106 sends a feedback message to the user device via appropriate leader to present to the subject driver of the vehicle who requires instant feedback message to draw his/her attention.

In an embodiment, there may be one or more members in a clique designated as leaders to share the work load. The leader may also store the identification of its clique members, relative location, received signal strength, number of members, navigation data, lane data, and other data in an appropriate form such as a database, file storage or any other form in a computer readable medium. R rating server 106 may store the necessary information about the members in each clique and leaders.

In an embodiment of the invention, the leader may perform some or all the processing of rating server 106 and coaching server 108. Additionally, the leaders of neighboring cliques may communicate to each other to provide feedback message and coaching to subject drivers. In another embodiment, the leaders may communicate to roadside units (not shown) to send data to other leaders or to server systems (106 and 108) or any other appropriate systems. In an alternative embodiment, the system may be implemented as a centralized system, fully distributed system or hybrid of central and distributed system.

At the commencement of driving or when starting the driver performance rating application program, a user device may search for an appropriate clique in the vicinity to join. However, if there are no cliques to join, the device may form a new clique and declare itself as the leader and start communicating with rating server system 106 to register its presence by sending data including its identity, location, current time, destination, vehicle identity, user identity (subject driver), available resources in the device, other relevant data, and any combination thereof. Rating server 106 may monitor each clique and based on the number of members in a clique, the server may inform to merge two or more cliques to form one clique or to split a clique into two or more cliques with leaders appointed for each clique.

If one or more members of a clique changes direction of movement at an intersection or stops moving or the received signal strength goes below a predetermined threshold, the member searches for an appropriate clique to join. If there are no cliques to join, the one or more devices may form a new clique and one of the devices become the leader. In another embodiment, the leaders of the neighboring cliques may communicate to each other to move one or more members from one clique to another. For example, if the signal strength or the distance to a member in one clique does not satisfy the predetermined conditions, the leader may find another clique for that member. In a preferred embodiment, the vehicles moving in the same direction may be in one clique. In an alternative embodiment, the vehicles moving in different directions may also be in the same click. A leader or the server may limit the maximum number of members in a clique to a predetermined value.

Figure 2:
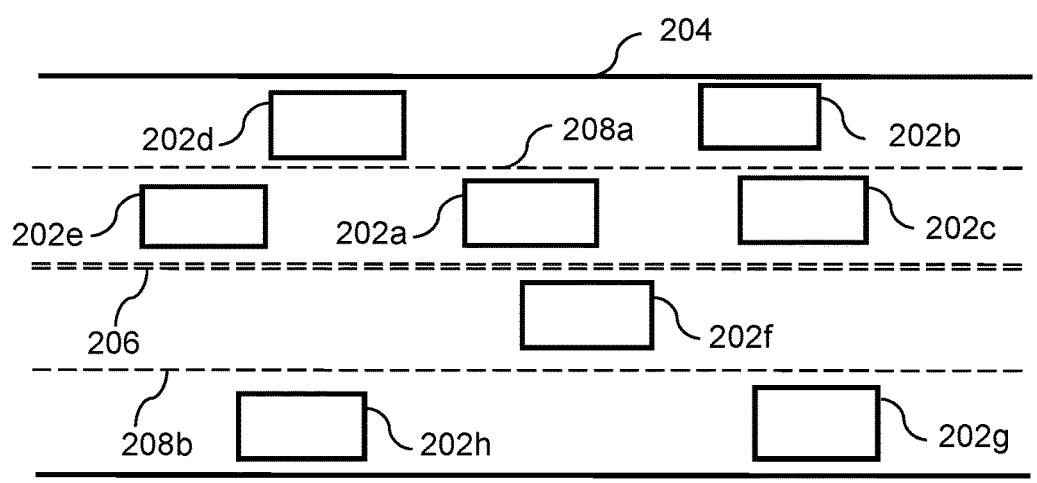
FIG. 2 illustrates a schematic diagram of a road segment and example users with appropriate devices (shown as a rectangular block) for rating driver performance in accordance with an embodiment of the invention.

FIG. 2 illustrates an example schematic diagram of a road system. The users 202a to 202h are on the road segment 204 wherein, each users possess a correctly configured user device to send a driver performance message and receive a feedback message, coaching and other appropriate data in accordance with an embodiment of the invention. The rectangular blocks 200a to 200h denote the users (drivers/subject driver) on a vehicle with a user device travelling on the road. In a non-limiting example, the users 202a to 202h may be people travelling on bicycles, motor cycles or vehicles including private or public transport systems. In another embodiment, the users may also be pedestrians (not shown). Users 202a to 202e travel in one direction, the users 202f to 202h travel in the opposite direction of the road segment. Double dashed line 206 indicates the marking on the road to indicate the opposite directions of travel on the road segment 204. The single dashed lines 208a and 208b indicate lane markings on the road segment 204. The road markings may depend on the type of road, region, territory, and country.

In FIG. 2, a rectangle box is shown to indicate a user with appropriate device in a vehicle. However, in an embodiment, appropriate image icons (two-dimensional or three-dimensional image) of the vehicles representing the size, shape, make and/or model may be displayed on a display device. In another embodiment, one or more alphanumeric characters in the vehicle registration number or some other form of identification representing the vehicle may also be displayed. In yet another exemplary embodiment, if a user (observer user) wants to send driver performance message to another user (subject driver), the observer user chooses the correct vehicle icon representing the target vehicle displayed on the screen by touching the smart screen of the user device and sends appropriate driver performance message based on the driving performance of the subject driver. The user input may include, but is not limited to touch input on a touch pad, voice input, gesture based input or by any other method of input known to a skilled person in the relevant art. In another exemplary embodiment, in a voice based input system, an observer user may say the ID displayed along with the target vehicle icon, say the driver performance metric and the driver performance message to send a driver performance message. In a non-limiting example, to give a star rating to a subject driver with vehicle ID 5 the observer user may say the following: "vehicle ID 5, maintaining vehicle within lane, 4 stars". The system may apply appropriate voice recognition system to recognize the driver performance message and process appropriately. In yet another non-limiting example, to give an alert to a subject driver with vehicle ID 7 the user (observer user) may say the following: "vehicle ID 7, driver missed green traffic signal, alert the driver". This alert may be presented to the intended subject driver via a user device in the target vehicle.

In an embodiment, it is also possible for an observer user to select multiple users (target drivers) to provide appropriate messages. In a non-limiting example, an observer user travelling in the opposite direction (example: user 202f) may select multiple subject drivers (non-limiting example: users 202a to 202e) to send a driver performance message indicating a traffic incident ahead of them that may be interesting to these subject drivers. A traffic incident may include, but is not limited to traffic congestion, accident, road work, lane closure, failed traffic signal, and broken down vehicle. These types of information messages may not be taken into account when calculating driver performance score, integral rating and/or assessing driving quality of a subject driver. However, the observer user who initiates these information messages may receive some kind of reward or incentive.

In an embodiment, a message sent by an observer user to a subject driver about defect in the target vehicle may not be taken into account in calculating the driver performance score and/or integral rating. However, if the subject driver does not repair the defect within a predetermined time, a message related to a defect in a target vehicle may be taken into account depending on the type of defect or other features of the vehicle.

FIG. 3 illustrates example user interfaces of the rating application according to an embodiment of the invention. FIGS. 3a to 3f illustrates the main screen, map view screen, alert screen, rating screen, notification screen, and caution screen respectively. It will be appreciated that the interface screens provided in FIG. 3 are not the only screens that could be implemented or the items displayed in each screens are not the only items that could be displayed. However, a person with ordinary skill in the relevant art may implement additional screens, fewer screens, additional features in each screen, fewer features, and any combination thereof when testing, using and/or implementing the invention. In a non-limiting example, the items displayed on the screens may be implemented as widgets including, but not limited to soft buttons, image buttons, scroll list, drop-down menu, slider, radio button, and any combination thereof. A user may touch on an item to select the appropriate item. In another non-limiting example, if a first user wants to see the map view he/she may touch the "map view" button from the main screen to go the map view shown in FIG. 3b. The map view screen displays the first vehicle (in this non-limiting example the first user is the rectangular block numbered 4) and neighboring vehicles as appropriate icons. If an observer user wants to send driver performance message to a subject driver, he/she may touch the target vehicle icon in the map view screen and then select the appropriate message from the appropriate screens.

Figure 3A:
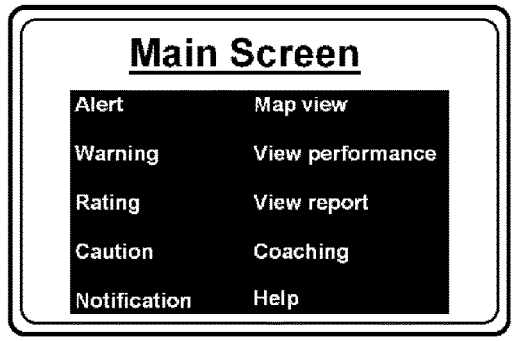
FIG. 3a is an exemplary user interface displaying a main screen of the rating application program in accordance with an embodiment of the invention.
Figure 3B:
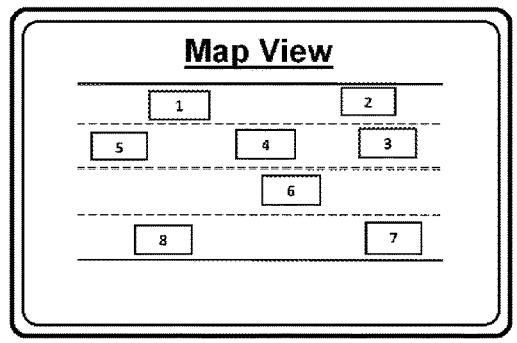
FIG. 3b is an exemplary user interface displaying neighboring vehicles on a map of a road segment in accordance with an embodiment of the invention.
Figure 3C:
FIG. 3c is an exemplary user interface of an alert screen of the rating application program in accordance with an embodiment of the invention.
Figure 3D:
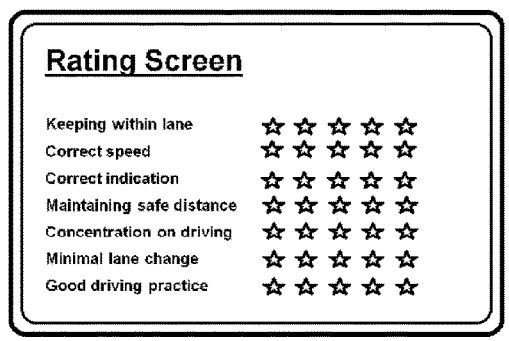
FIG. 3d is an exemplary user interface of a rating screen of the rating application program in accordance with an embodiment of the invention.
Figure 3E:
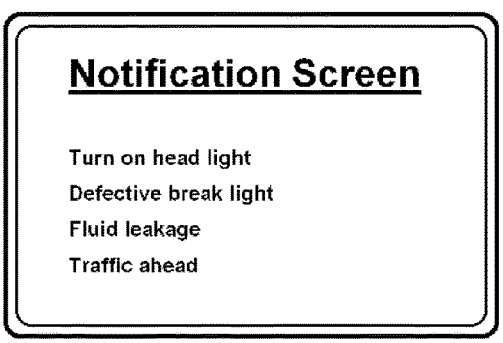
FIG. 3e is an exemplary user interface of a notification screen of the rating application program in accordance with an embodiment of the invention.
Figure 3F:
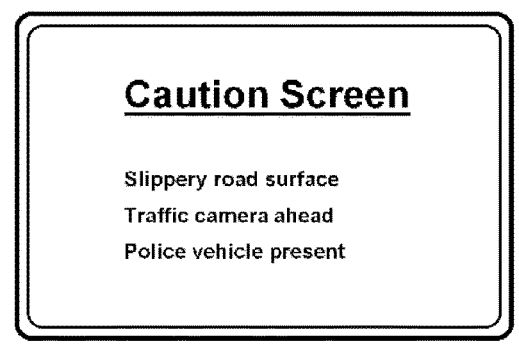
FIG. 3f is an exemplary user interface of a caution screen of the rating application program in accordance with an embodiment of the invention.

In FIG. 3b, the vehicles are shown as rectangular blocks however, in the actual application, these vehicle icons may represent the make, model, shape, size, color and other features that may be useful for a user to easily identify a vehicle from the display screen. In this non-limiting example, the vehicles are given an identification number 1 to 7 (the first vehicle is given the ID 4). It is also possible to view the neighboring vehicles in other forms or view such as satellite map, three-dimensional map, street view and the like. In a non-limiting example, if the first user (observer user) wants to send an alert to the subject driver of the vehicle with ID 3 for crossing the double line lane marking, the first driver may touch the displayed icon of the vehicle 3 and the application may display a drop down menu (not shown) displaying different types of driver performance messages such as alert, warning, rating, notification, and caution. The first user may touch on the alert from the dropdown menu and the rating application may display the alert screen as shown in FIG. 3c. From this screen the first user may touch the "imminent accident" or appropriate message category to send an alert. This may be directly sent to the intended user (subject driver) or via rating server 106. In another embodiment, the rating application program may accept voice input. In a non-limiting example, the first user may say the following to send an alert "vehicle 3, imminent accident" or "vehicle 3, maintain within the vehicle lane markings" and the like. The driver performance rating system may apply appropriate voice recognition algorithm to process the voice input and to present the alert in a form such as visual, audio, multimedia, haptic, or vibration. Similarly, the driver performance rating system may also accept other types of inputs such as hand gesture, face gesture, gazing direction and the like. These may be appropriately implemented using appropriate gesture recognition algorithm, gazing direction recognition algorithm and other state of the art algorithms to implement the different input methods. Example methods may include, but are not limited to artificial neural network system, Bayesian approaches, and other state of the art pattern recognition or machine learning algorithms that is known to an ordinary person of skill in the relevant art.

Figure 4:
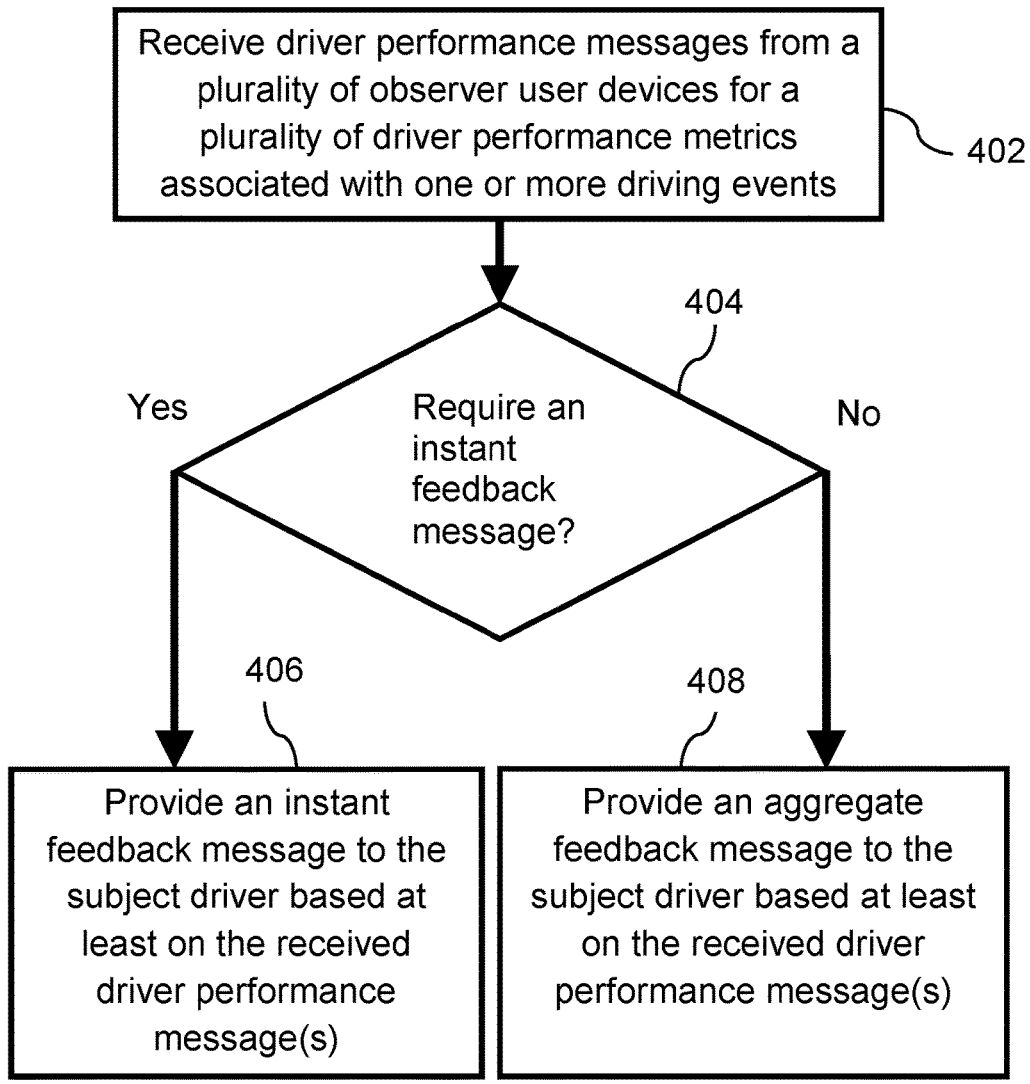
FIG. 4 is a flow chart illustrating a method for providing instant and/or aggregate feedback message based at least on the received driver performance message according to an embodiment of the invention.

FIG. 4 is a flow chart illustrating a method for determining whether an instant feedback message is required in response to a received driver performance massage and providing appropriate feedback message to the subject driver to dynamically adjust driving behavior according to an embodiment of the invention. At step 402, the method receives driver performance messages from one or more observer users for one or more driver performance metrics associated to one or more driving events performed by a subject driver.

At step 404, the method determines whether an instant feedback message is required to be sent to the subject driver in response to one or more driver performance messages. In a non-limiting example, if the received driver performance message is an alert received for not checking blind spot when turning or changing lane, unintentionally leaving lane or not noticing the change of traffic light signal from red to green, the method may send an alert to the subject driver immediately. In another embodiment, any driver performance message requires immediate attention of the subject driver may be sent an instant feedback message. For driver performance messages that do not require an instant feedback message to the subject driver, an aggregate feedback message may be provided at a later time.

At step 406, the method provides instant feedback message to the subject driver to draw the driver's attention on driving the target vehicle, to minimize potential hazard, to avoid imminent accident and the like. In a non-limiting example, in response to a driver performance message received for a subject driver not noticing the change of traffic light signal from red to green, the method either sends a "beep" sound and/or pre-recorded message to notify the subject driver appropriately via the user device. It is also possible for a user to customize how the feedback message is presented for different driver performance messages.

At step 408, the method provides aggregate feedback message to the subject driver at an appropriate time. In an embodiment, an aggregate feedback message may be determined by counting the number of alerts, cautions, warnings, notification, and average star ratings received during a journey, during a predetermined time period (non-limiting examples: 1 hour, 1 day, 1 week or 1 month based on the user preference) or a predetermined distance (non-limiting examples: 10 kilometers, 100 kilometers or 1000 kilometers) travelled by the subject driver.

By way of example, the aggregate feedback message may be some statistical values representing the equivalent star rating of the driver performance messages received for different types of messages (alert, warning, caution and the like) or different driver performance metrics received by a subject driver for every 100 kilometers of driving or 10 hours of driving. It is noted that these are just example values, a person of ordinary skill in the art may use other appropriate values in using or in implementing the invention. The statistical value may include, but is not limited to statistical mean, variance, standard deviation, entropy, higher order statistics, other statistical values and any combination thereof. In a non-limiting example, different types of driver performance messages may be appropriately converted to equivalent star rating and the messages may be counted if they are within a predetermined range of equivalent star rating.

In an alternative embodiment, the aggregate feedback message may also include driver performance score and/or integral rating calculated over a predetermined time period or predetermined distance travelled. The feedback message may be the representation of received driver performance messages in a geographic region, type of road, time of day and the like. In a further embodiment, the aggregate feedback message may include, but is not limited to number of driver performance messages for each driver performance metric with geographic location, the variation in number of received driver performance messages for each driver performance metric with time and/or distance travelled, variation of driver performance score with time and/or distance travelled, variation of integral rating with time and/or distance travelled, coaching materials to improve driving, other appropriate information, and any combination thereof.

In a further embodiment, the driver performance score may be calculated by converting all the driver performance messages to a common scale and calculating statistical values representing the messages. The integral rating may be obtained by calculating the statistical values of the received driver performance messages for each driver performance metrics separately. The driver performance messages may also be processed for removing outliers, account for individual differences, sender's credibility, application for which the driver performance score/integral rating is used and any combination thereof.

Figure 5:
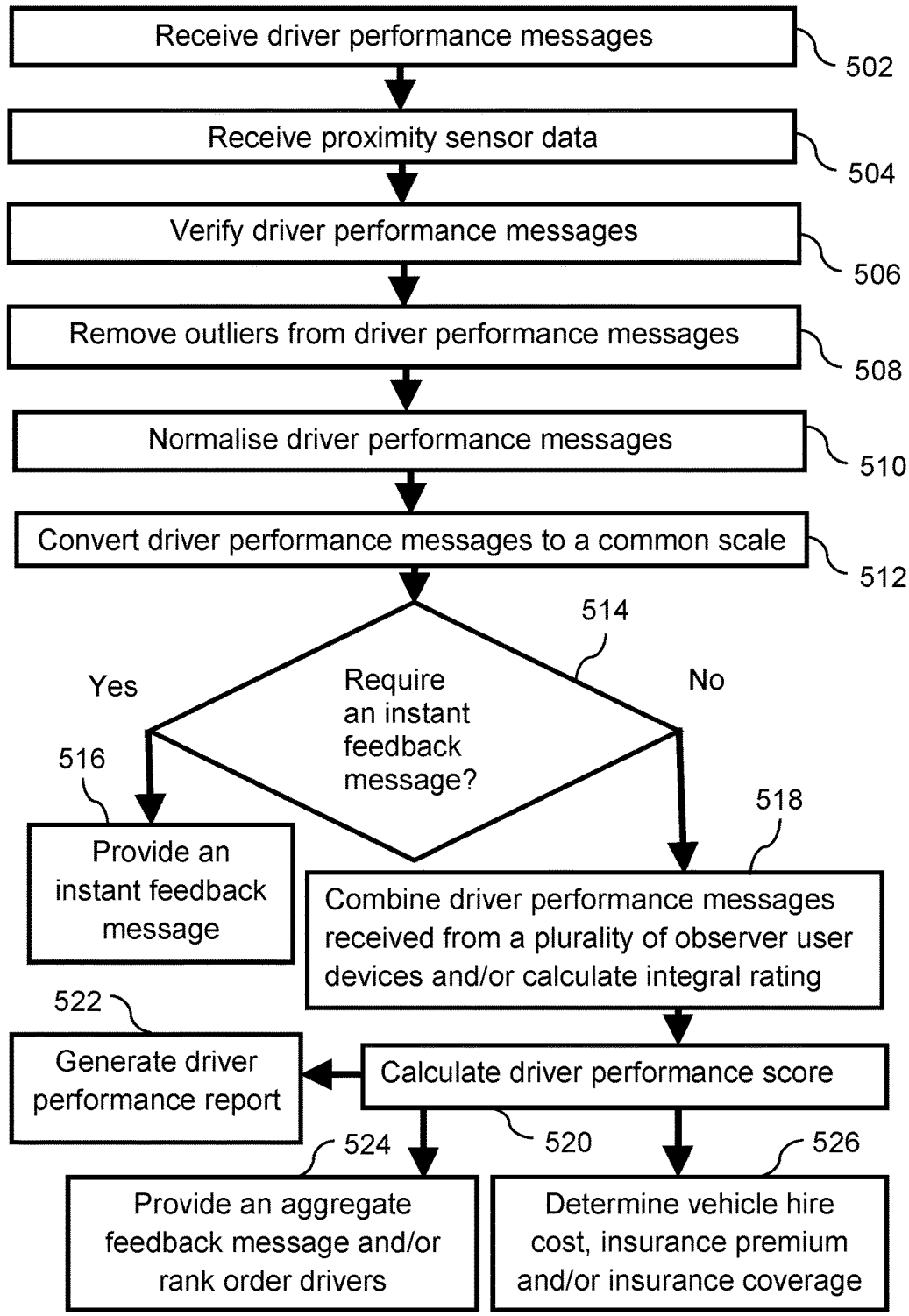
FIG. 5 is a flow chart illustrating a method for calculating the integral rating and/or driver performance score to perform at least one from a list including providing an instant feedback message, providing an aggregate feedback message, calculating cost of insurance, determining insurance coverage, calculating cost of hiring a vehicle, determining a rank order of drivers among a group of drivers, and generating a driver performance report according to a preferred embodiment of the invention.

FIG. 5 illustrates a flow chart of a method for calculating one or more from a list including driver performance score, integral rating, insurance premium, insurance coverage, cost of hiring a vehicle, a rank order of drivers, and producing driver performance report according to a preferred embodiment of the invention.

At step 502, the method receives one or more driver performance messages from one or more observer users for one or more driver performance metrics associated to one or more driving events performed by a subject driver. In an embodiment, when an observer user sends a driver performance message to a subject driver, the observer user who sends driver performance message may add supporting data including, but not limited to comments, photos, video related to the driving event, and other evidence. Comments may include a detailed description of the event and other relevant details of the driving event for which the message is sent. The comments may also be in appreciation for a driver performance message or for performing a driving event. In a non-limiting example, a driver may appreciate another driver for notifying failure of a brake light, leakage of oil from the target vehicle, allowing merging traffic to smoothly get onto a motor way or alerting a subject driver who drives above the posted speed in a road segment where there is speed monitoring system is installed. Evidence may include proximity sensor data that verifies the driving event/driver performance message. The suggestions may include ways to avoid such mistakes in the future, ways to improve driving quality, sources of resources to find information/training to improve driving quality. Rating server 106 and coaching server 108 may appropriately process the supporting data (non-limiting example: comments, photos and videos) relating to a driver performance message when processing the driver performance messages and give appropriate weight to the driver performance messages when calculating integral rating and/or driver performance score.

The supporting data may or may not be presented to the subject driver depending on the content of the driver performance message.

At step 504, the method receives appropriate proximity sensor data that may be used to verify the driver performance messages, identify neighboring vehicles, identify users (drivers/devices), collect appropriate data for correct operation of the driver performance rating system, generate automatic driver performance messages, and any combination thereof. In a non-limiting example, proximity sensor devices may include, but are not limited to speedometer, accelerometer, gyroscope, image/video camera, infrared camera, other appropriate imaging devices, localization devices, LIDAR, body sensors, radar, wireless sensor detectors, other radio wave detectors, and any combination thereof.

At step 506, the method verifies a received driver performance message from an observer user to a subject driver associated with a driving event using messages received from other observer users for the same driving event or with proximity sensor data or by some other means.

In a non-limiting example, if an observer user sends a driver performance message to a subject driver for being too slow or over speed, the speedometer reading in the target vehicle may be used to verify the message. In another non-limiting example, the speedometer reading in the vehicle, speed limit of the road, and the speed of other vehicles in the road segment may be used to assess the validity of the driver performance message. Hard acceleration and/or hard braking may also be verified with an accelerometer reading. In a further non-limiting example, if a user sends a driver performance message for not indicating when turning or changing lane, this may be verified by appropriately receiving the relevant information from the vehicle control computer or from a camera fitted on the vehicle, neighboring vehicle or in the environment. Based on the outcome of the verification step, the driver performance message may be appropriately weighted when calculating the integral rating and/or driver performance score. Furthermore, based on the verification results the observer user's credibility may be updated.

In an embodiment, an observer user may be allowed to send driver performance message to a subject driver for a driving event if the user was present at the location when the driving event occurred. Location of a user and location of a driving event may be verified using location and time measurements obtained from the user device. It may also be possible for an observer user who is not on the road, but in the vicinity (non-limiting examples: home, office, and shopping centre) where a driving event occurred to send a driver performance message related to that driving event. These ratings may be weighted appropriately when calculating the integral rating and/or driver performance score depending on the evidence to validate the message or based on the credibility of the observer user.

In an embodiment, driver performance messages may be provided in real time or at a later time when the user is free from driving. An observer user may provide rating (driver performance message) to a subject driver for one or more driving events immediately or when the observer user stops driving or when arriving at home. In non-limiting example, if the driver performance message is not urgent, the observer user may select the subject driver (target vehicle) to whom the observer user wants to send a driver performance message while driving and may provide the driver performance message when the observer user stops driving. In another non-limiting example, an observer user may note the location or time or the identity of the vehicle associated to a driving event by clicking an appropriate button or other form of input to note the event in the driver performance rating system and when the observer user stops driving (non-limiting examples: after parking, arrived at home, arrived at office) he/she may retrieve the relevant information of the noted driving events to provide driver performance messages for the driving event. When an observer user notes a driving event to send a driver performance message at a later time, the rating application program or the driver performance rating system may store the relevant data that may be useful to identify the driving event and to generate appropriate driver performance message.

A user may be allowed to provide rating/driver performance message for a driving event within a predetermined time period (non-limiting example: within 24 hours) after the driving event occurred. Any attempts of providing a driver performance message after that predetermined time period may be blocked by the driver performance rating system or any driver performance messages provided after the predetermined time period may not be taken into account or may be given less weight when calculating an integral rating and/or a driver performance score.

At block 508, the method processes the received driver performance messages to detect and remove any outliers. In an embodiment, if more than one users send a driver performance message for the same driver performance metric associated to the same driving event, the system may apply appropriate statistical analysis to remove any outliers or may take only one driver performance message received from the most credible user or a statistical mean (or other statistical values) of all the driver performance messages received from a plurality of users. In an embodiment, the system may weigh the driver performance messages based on the senders' credibility created based on the past history of messages. In a non-limiting example, outliers may also be removed by taking only the driver performance messages that are within a predetermined range from the statistical mean of driver performance messages received from all the observer users for the driving event or based on the sensor data.

In an alternative embodiment, the received driver performance messages from a user may be compared with messages received from other users. In a non-limiting example, if 10 observer users send a star rating to a subject driver for a driver performance metric associated to a driving event, if 8 observer users' ratings are almost the same and the other two observer users' ratings deviate significantly (outside a predetermined range from the statistical mean of the 10 messages), then the system may identify these two as outliers and mark the two observer users appropriately. The driver performance message received from these two users may be processed appropriately such that the contribution of these unreliable observer users have less influence compared to a rating received from a more reliable observer user when calculating the integral rating and/or driver performance score of a subject driver.

In an embodiment of the invention, rating server 106 may monitor the pattern of driver performance messages sent and received by users to identify users who misuse the driver performance rating system. In a non-limiting example, the system may identify the observer user who sends either good or poor rating repeatedly many times within a predetermined time period to a particular driver or a group of drivers and take appropriate action against that user. In another non-limiting example, an observer user who sends substantially too many driver performance messages compared to average users, that observer user may be identified by the system and take appropriate action. The action may be informing the observer user about inaccuracy in providing driver performance messages and/or provide instructions and/or training about how to give a correct driver performance message to a driving event. Outliers and misbehaving users may be identified by applying statistical methods such as analysis of variance or any other appropriate pattern recognition algorithm known to a person of ordinary skill in the relevant art.

In an embodiment, the driver performance messages received from the users who misuse the system may be weighted appropriately or ignored. In some cases, some of the features in the rating application may be disabled for a predetermined time period for the users who misuse the driver performance rating system. If the user repeatedly misuses the driver performance rating system, the user may be blocked for a longer period of time or barred completely from using the driver performance rating system.

In an embodiment, the system may limit the maximum number of driver performance messages provided for each type of message by an observer user during a predetermined time period. A user may also be able to compare his/her rating skill with that of other users, for example, how his/her rating differs from a majority of users, or a mean rating of other users. This may make the user improve his/her rating skill and provide more effective driver performance messages. A user's credibility may depend on a number of factors including, but not limited to, the number of years of driving experience, past history of rating or deviation in rating from a mean rating.

In an embodiment, ratings given by certain users may be given priority compared to others. For example, a warning, caution or alert sent by an on-duty police officer, fire brigade, or an emergency officer may be given priority, weighted differently or sent to intended users directly without sending it to rating server 106 for processing, depending on the type of message. The prioritization of driver performance messages and/or determining whether to send a message directly to one or more intended subject drivers may also be performed by a clique leader. If the message is intended for more than one subject driver, the observer user device or the clique leader may either broadcast or multicast to the appropriate subject drivers.

At step 510, the method accounts for individual differences in sending driver performance messages by different observer users. In a non-limiting example, if a user always gives lower rating relative to an average user, the system may apply an appropriate normalization to correct for the individual difference in providing driver performance messages.

In another non-limiting example, different users may give different star ratings for the same driving event. These individual differences may need to be appropriately accounted for when obtaining better performance of the system. In an embodiment, these normalization factors to account for the individual differences may be estimated by applying statistical analysis such as analysis of variance or other pattern recognition methods on the current and/or past history of driver performance messages received from different observer users. The weight given to a driver performance message received from an observer user may also depend on the credibility of the observer user. Credibility of a user may represent how consistent a user in providing driver performance message in different driving events and/or different driver performance metrics. In another embodiment, credibility of a user may represent by how much a driver performance message may deviate compared to proximity sensor measurements and/or compared to a majority of the observer users.

At step 512, the method may convert the different types of driver performance messages (non-limiting examples: alert, star rating, warning, caution, and notification) to a common scale such as star rating (0 star to 5 stars) or percentage score (0% to 100%)). In a non-limiting example, the different types of driver performance messages may be converted to an appropriate value based on the credibility of the user, driver performance metric, any evidence presented for the driver performance message, driving event, and any combination thereof. In a non-limiting example, an alert for a particular driving event may be converted to equivalent star rating (non-limiting example: 3 stars) when determining the integral rating and/or driver performance score of a subject driver. Similarly, warning, caution, and notification may also be converted to an equivalent star rating depending on the application for which the driver performance is assessed. It is also possible to use any other scale other than a star rating to convert messages to calculate an integral rating and/or driver performance score.

Steps 514 and 516 are the same or similar to the steps 404 and 406 in FIG. 4.

At step 518, the method combines the driver performance messages received from one or more observer users for each driver performance metric separate for each subject driver. The output of this step may include an integral rating. At this step the method may combine (case 1) driver performance messages received from a plurality of observer users for the same driving event, (case 2) a plurality of driver performance messages received from the same observer user intended for the same subject driver during a predetermined time period, and (case 3) a plurality of driver performance messages received from a plurality of observer users for one or more driver performance metrics during a predetermined time period for a subject driver.

Case (1): If a plurality of users send driver performance messages for the same driving event for the same driver performance metric performed by a subject driver, the method may take the statistical mean of all the message values, median value, the highest message value, the lowest message value, and the message received from the most credible observer user. In another embodiment the driver performance messages received from a plurality of observer users may be combined based on the credibility of individual observer users or some other statistical representation of the messages.

Case (2): In an embodiment, if the same user gives a plurality of driver performance messages to a particular subject driver within a predetermined time period, the system may take only one message into account when calculating the integral rating and/or driver performance score. In a preferred embodiment, the plurality of driver performance messages received from an observer user intended for a subject driver may be combined by assigning linearly or non-linearly decreasing weight with the number of messages received or with time. By way of example only, if an observer user has given "n" number of messages to particular subject driver during a predetermined time period, the first message may be given a higher weight, the second message may be given a smaller weight than the first message, the third message may be given a smaller weight than that of the second message and so on. The weight may reduce in a linear or nonlinear fashion. For example, if the plurality of messages are $m_1, m_2, m_3, m_4 \ldots m_n$. In a non-limiting example, method of combining a plurality of messages from the same observer user to the same subject driver may be combined by calculating the sum of the following quantities $m_1/1, m_2/2, m_3/3, m_4/4, \ldots m_n/n$. In another non-limiting example, the messages may be combined as the sum of the following quantities $m_1/K^1, m_2/K^2, m_3/K^3, m_4/K^4, \ldots m_n/K^n$, where K is a constant (non-limiting value of K may be a positive number greater than 1), the superscripts mean the exponent or power (for example, if K=2, then $K^2$ is equal to 4), and the subscripts mean the different driver performance messages received (for example: $m_1$ is the first message, $m_2$ is the second message, $m_3$ is the third message, and so on). In another non-limiting example, some other appropriate linearly or nonlinearly varying weighting with the number of messages received may be used to combine the plurality of messages received from the same observer user during a predetermined time. This reducing weight is used to minimize any effect of an observer user abusing the system such as a group of users rating each other's driving to either improve or degrade their integral rating and/or driver performance score.

Case (3): If a subject driver receives a plurality of driver performance messages for one or more driver performance metrics from a plurality of observer users within a predetermined time period, the weighting given to each of the driver performance messages may increase linearly or non-linearly with the number of messages received with time. For example, a subject driver often drives above the posted speed limit may receive multiple driver performance messages (star rating or alert) within a certain distance or certain time period. The system may increase the weight for the messages either linearly or nonlinearly with the number of messages received from different observer users for separate driving events within a predetermined distance. In a non-limiting example, driver performance messages $(m_1, m_2, m_3, m_4 \ldots m_n)$ received for a subject driver from different observer users for a plurality of "over speed" driving events may be combined as follows: $1 \times m_1, 2 \times m_2, 3 \times m_3, 4 \times m_4 \ldots, n \times m_n$, where "×" means multiplication. Here, the driver performance message received for a first driving event is multiplied by 1, the message received for a second driving event is multiplied by 2, the message received for a third driving event is multiplied by 3, and so on. In another non-limiting example, the messages may be combined by calculating the sum of the following quantities $K^1 \times m_1, K^2 \times m_2, K^3 \times m_3, K^4 \times m_4, \ldots K^n \times m_n$, where K is a constant (non-limiting example value may be a positive number greater than 1), the superscripts mean the exponent or power (for example, if K=2, then $K^2$ is equal to 4), and the subscripts mean the number of messages received (for example: $m_1$ is the message for a first driving event, $m_2$ is the message for a second driving event, $m_3$ is the message for a third driving event, and so on). In another non-limiting example, the driver performance messages may be multiplied by some other appropriate time varying weight. In an alternative embodiment, different variations of weights may be used for different driver performance metrics. In a non-limiting example, a plurality of driver performance messages received for repeated "over speed" driving events may be combined with a nonlinearly increasing weight. However, a plurality of messages received for repeated "hard acceleration" may be given linearly increasing weight or a different nonlinear weight variation than that of "over speed" when combining driver performance messages.

In an embodiment, the weight assigned to a driver performance message may depend on the percentage exceeded from a predetermined threshold or how long a trip lasted after receiving an instant feedback message. In a non-limiting example, if a driver performance message is sent to a subject driver for being over speed, the method may calculate the percentage of the speed exceeding a predetermined threshold (speed limit posted on the road or any other appropriate value) and assign weight to the driver performance message accordingly. In another non-limiting example, the weight may assigned to a driver performance message may increase with the time duration of the associated driving event.

In a further embodiment, the weight assigned to a driver performance message may depend on the driving event, type of vehicle, weather condition, environmental conditions, geographic location, type of road, time of day and any combination thereof. In a non-limiting example, a driver performance message sent to a police or emergency vehicle for driving over speed may be given zero weight. In another example embodiment, a message received for driving over speed at a school zone (when it is in operation) may be given a relatively higher weight.

In an embodiment, an element of the integral rating is calculated by combining the driver performance messages received for one or more driver performance metrics during a predetermined time period.

In an alternative embodiment the integral rating may include the total number of messages and the mean value of all the messages received by a subject driver for each driver performance metric (elements of the integral rating) during a predetermined time period. In another embodiment, the integral rating may be the total number of messages and some statistical measure of the values of the driver performance messages received by a subject driver for each driver performance metric during a predetermined time period. Here, the statistical measures/values may include, but are not limited to (a) mean and variance, (b) mean and standard deviation, (c) median and variance or some higher order statistics, and (d) any other appropriate statistical measure known in the art to represent a distribution of variables in a finite dimensional space. The mean may be any type of mean including geometric mean, arithmetic mean, harmonic mean and the like. In a preferred embodiment, the integral rating may have a separate count representing the number of driver performance messages received for each driver performance metrics and some appropriate statistical measures representing the distribution of received driver performance messages for each driver performance metric.

At step 520, the method combines driver performance messages received for a plurality of driver performance metrics to calculate the driver performance score of a subject driver. In an embodiment, a user, group of users or a third party may define an appropriate driver performance score (user defined driver performance score) to assess the performance of one or more subject drivers of target vehicles or operators of machines or systems and the like. The rating application program may provide the required interface for a person to define an appropriate driver performance score based at least on the driver performance messages received for one or more subject drivers during a predetermined time period.

In an embodiment, the driver performance score may be calculated by appropriately weighting driver performance messages received from a plurality of observer users for plurality of driver performance metrics. The weights given to combine driver performance messages for different driver performance metrics may depend on the application for which the driver performance score is used. Example applications may include, but are not limited to calculating an insurance premium, calculating the cost of hiring a vehicle, managing drivers in a company, recruiting drivers, and the like.

In an embodiment, the driver performance score may be calculated by appropriately weighting driver performance messages, any evidence, and vehicle driving data. In another embodiment, the driver performance score may include, but is not limited to one or more from the following list: one or more elements of integral rating, appropriate statistical representation of driver performance messages received during a predetermined time period, linear or nonlinear combination of driver performance messages converted to a common scale, and any other appropriate score that is known to a person of ordinary skill in the art to combine the driver performance messages to indicate the quality of driving of a subject driver. In yet another embodiment, the calculation of driver performance score may also incorporate any traffic offences committed in the past, vehicle driving data and evidence related to driver performance messages. In a further embodiment, the calculation of driver performance score may also include environmental data, current traffic conditions, road conditions, vehicle state, other data, and any combination thereof. In yet another embodiment, the driver performance score may be calculated by combining the elements in the integral rating wherein the weight given for each element may be dependent on the application for which the driver performance score is used.

In an embodiment, the weights given to driver performance messages when combining driver performance messages received for a plurality of driver performance metrics may also vary with the time of day, geographic location, type of vehicle, the subject driver, type of license held by the subject driver, age of the subject driver, number of years of driving experience of the subject driver, observer user who sent the driver performance message, and any combination thereof.

In a non-limiting example, at a reference time, the driver (subject driver) may be given a 100% or 5 stars driver performance score. Every time a valid driver performance message is received, the driver performance score may change by an appropriate value based on the equivalent star rating of the received driver performance message. In a non-limiting example, if a subject driver receives 3 stars in a 5 stars scale, the reduction in the driver performance score may be W×(5−3), where "x" means multiplication, and "W" is a predetermined weighting factor that depends on factors including, but not limited to application to which the driver performance score is used, credibility of the observer user who gave the driver performance message, driver performance metric for which the driver performance message is received, number of times the same driving event occurred within a predetermined time period, and any combination thereof.

In an exemplary embodiment, if a subject driver receives 5 stars out of 5 stars (or 100% in a percentage score), his/her driver performance score may not change. In an alternative embodiment, the driver performance score may improve for every 5 stars (or 100% in a percentage score) received by a subject driver depending on the driver performance metric and other conditions.

In an embodiment, the driver performance score may be calculated by converting all the driver performance messages for different driver performance metrics into a common scale such as a star rating or percentage score and calculating the mean of all the messages or an appropriate statistical value or set of values representing the messages.

At step 522, the method may generate a driver performance report about a subject driver based at least on the received driver performance messages during a predetermined time period. The driver performance report may depend on the application or the person to whom the report is presented. In an embodiment, the driver performance report may include, but is not limited to driver performance score, integral rating, aggregate feedback message, coaching materials to improve driving, other information presented to the subject driver, and any combination thereof. The driver performance report may also include, but is not limited to the variation in number of received driver performance messages for each driver performance metric with time and/or distance travelled, number of driver performance messages for each driver performance metric with geographic location, variation of driver performance score and integral rating with time and/or distance travelled, and any combination thereof.

The driver performance report may be presented to one or more entities including, but not limited to the driver, manager, police, fleet management company, insurance company, relevant government department, and any combination thereof. If the vehicle is a fully autonomous vehicle or partially-autonomous vehicle, the driving performance report may be given to the manufacturer of the vehicle, owner of the vehicle, government authority, any other relevant entity who is responsible for the autonomous driving system, and any combination thereof.

At step 524, the method may calculate aggregate feedback message and/or a rank order of drivers. Calculation of an aggregate feedback message is similar to step 408 in FIG. 4. Rank of a subject driver may be calculated based at least on the driver performance score and/or integral rating. Rank ordering of drivers may also be determined by appropriately processing the driver performance messages received over a predetermined time period.

At step 526, the method may calculate at least one of a cost of hiring a vehicle, insurance premium, and/or insurance coverage based at least on the received driver performance messages during a predetermined time period. In a preferred embodiment, the cost of hiring a vehicle, insurance premium, and insurance coverage may be determined based at least on the driver performance score calculated for a predetermined time period, variation of driver performance score with time, integral rating calculated for a predetermined time period, variation in number of received driver performance messages for each driver performance metric with time, number of driver performance messages for each driver performance metric with geographic location, distance travelled, and any combination thereof.

In some embodiments the steps illustrated in FIG. 5 may be performed in different order. In yet another embodiment one or more steps may be removed or added as needed.

Figure 6:
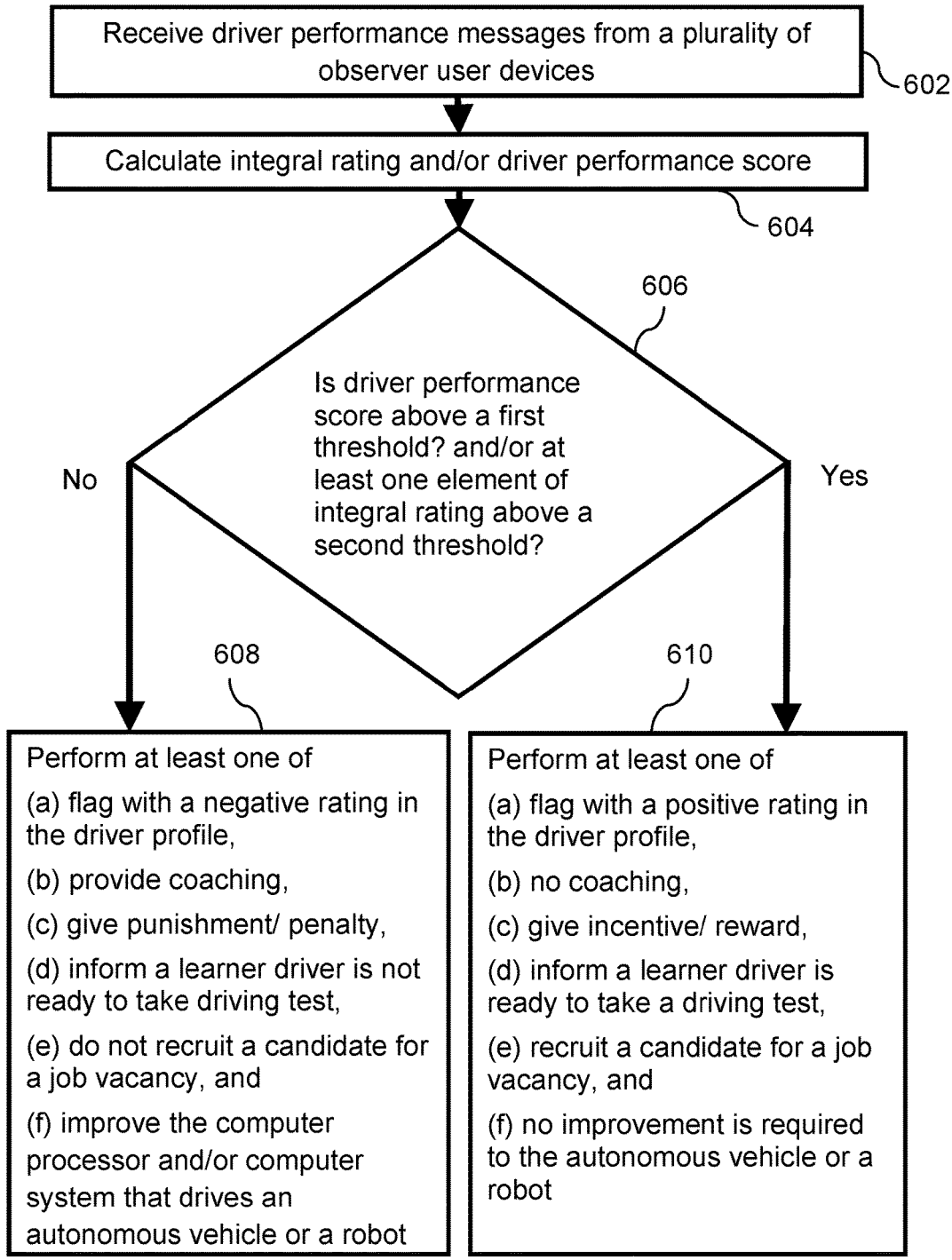
FIG. 6 is a flow chart illustrating a method for calculating the integral rating and/or driver performance score to perform at least one from a list including flagging with a negative/positive rating in the driver profile, providing coaching, giving punishment/penalty, determining whether a learner driver is ready for taking a driving test, recruiting drivers/workers, and improving driving performance of a driverless vehicle based at least on the received driver performance messages according to another preferred embodiment of the invention.

FIG. 6 illustrates a flow chart of a method for at least one from a list including: providing coaching, flagging with a positive/negative rating in driver profile, determining whether a learner driver (subject driver) is ready to take driving test, recommending whether to hire a candidate for a driving job, providing an incentive or reward, and improving the performance of the computer processor or computer system that drives an autonomous vehicle or a robot according to an embodiment of the invention. Step 602 is the same/similar to step 402 in FIG. 4.

At step 604, the method calculates the integral rating and/or driver performance score based at least on the receive driver performance messages as described above. In another embodiment, the method may calculate a user defined driver performance score for assessing the performance of a human driver and/or computer processor and/or computer system that drives an autonomous vehicle or a robot. The user defined driver performance score may be determined based on a linear and/or nonlinear combination of the received driver performance messages from a plurality of users (observer user) for a plurality of driver performance metrics.

At step 606, the method determines whether the driver performance score is above a first predetermined threshold and/or at least one element of the integral rating is above a second threshold. In a non-limiting example, the integral rating may be calculated by converting the driver performance messages to a scale such as a star rating or percentage score and calculating the statistical mean or an appropriate statistical value representing the messages received for each driver performance metric separately. If the driver performance score and/or the appropriate element of integral rating is above (yes) a first and second threshold respectively, at step 610 the method performs at least one of flagging the driver (subject driver) profile with a positive rating, do not recommend coaching, provide incentive/reward, determine that a learner driver is ready to take a driving test, determine that a candidate may be recruited for a driving job, and determine that no improvement is required for the computer processor and/or computer system that drives an autonomous vehicle or a robot.

If the driver performance score and/or the appropriate element of the integral rating is below (no) the first and second thresholds respectively, at step 608 the method may determine at least one of flagging in the driver profile of the subject driver with a negative rating, recommending coaching, giving punishment/penalty, determining a learner driver is not ready to take driving test, determining not to recruit a candidate for a driving job vacancy, and improving the computer processor and/or computer system that drives an autonomous vehicle or a robot.

It is noted that the first and the second predetermined thresholds may be different for each application (coaching, determining whether a learner is ready to take driving test, recruiting a candidate, and assessing the performance of a computer system that drives an autonomous vehicle). Further, if an application requires more than one element of an integral rating to be compared, then each element may be compared with appropriately chosen thresholds. These thresholds may be manually chosen by a user, learned from the past history of data by applying a pattern recognition algorithm or by some other means. In a non-limiting example, thresholds to recruit a candidate may be chosen based on the driver performance score and integral rating of the best employees or average of all employees in a company.

In an embodiment of the invention, if the driver performance score of the subject driver is below a predetermined threshold, the driver profile of the subject driver may be flagged with a negative rating. This negative rating may trigger a recommendation for driver coaching for the subject driver. If the driver performance score of the subject driver is above a predetermined threshold, the driver profile of the subject driver may be flagged with a positive rating. In another embodiment this positive rating may trigger a reward or discount for the subject driver. The discount may include, but is not limited to a discount in the vehicle hiring cost, discount in the insurance premium, discount in goods and services related to vehicle, and the like.

In a further embodiment of the invention, improving the computer processor and/or computer system that drives an autonomous vehicle or a robot may be performed by dynamically adjusting/dynamically learning at least one calibration factor of the driving system and/or computer processor of the autonomous vehicle to improve the driving performance of the autonomous vehicle based at least on the received driver performance score, aggregate vehicle driving data and driver performance messages obtained from the plurality of user devices (observer user devices). In another embodiment of the invention, a person or a computer may analyze the driver performance score, aggregate vehicle driving data, driver performance messages obtained from the plurality of observer user devices, and other relevant data to improve the performance of the computer processor, computer driving system and/or the computer program that is responsible for driving the autonomous vehicle.

In an embodiment, the user defined driver performance score may be used at step 606 to assess the performance of a human driver and/or computer processor and/or computer system that drives (or operates) an autonomous vehicle or robot or other appropriate machine/system.

In another embodiment of the invention the method may check whether the individual driver performance message(s) are below an appropriately chosen threshold at step 606. These thresholds may depend on the type of message, associated driver performance metric, driving event, credibility of the observer user, and other relevant data. In a non-limiting example, the method may convert the driver performance message to a scale such as a star rating (0 to 5 stars) or percentage score, and compare it with a predetermined threshold. Based on the comparison of the message with the predetermined threshold, the method may perform one of steps 608 and 610.

Figure 7:
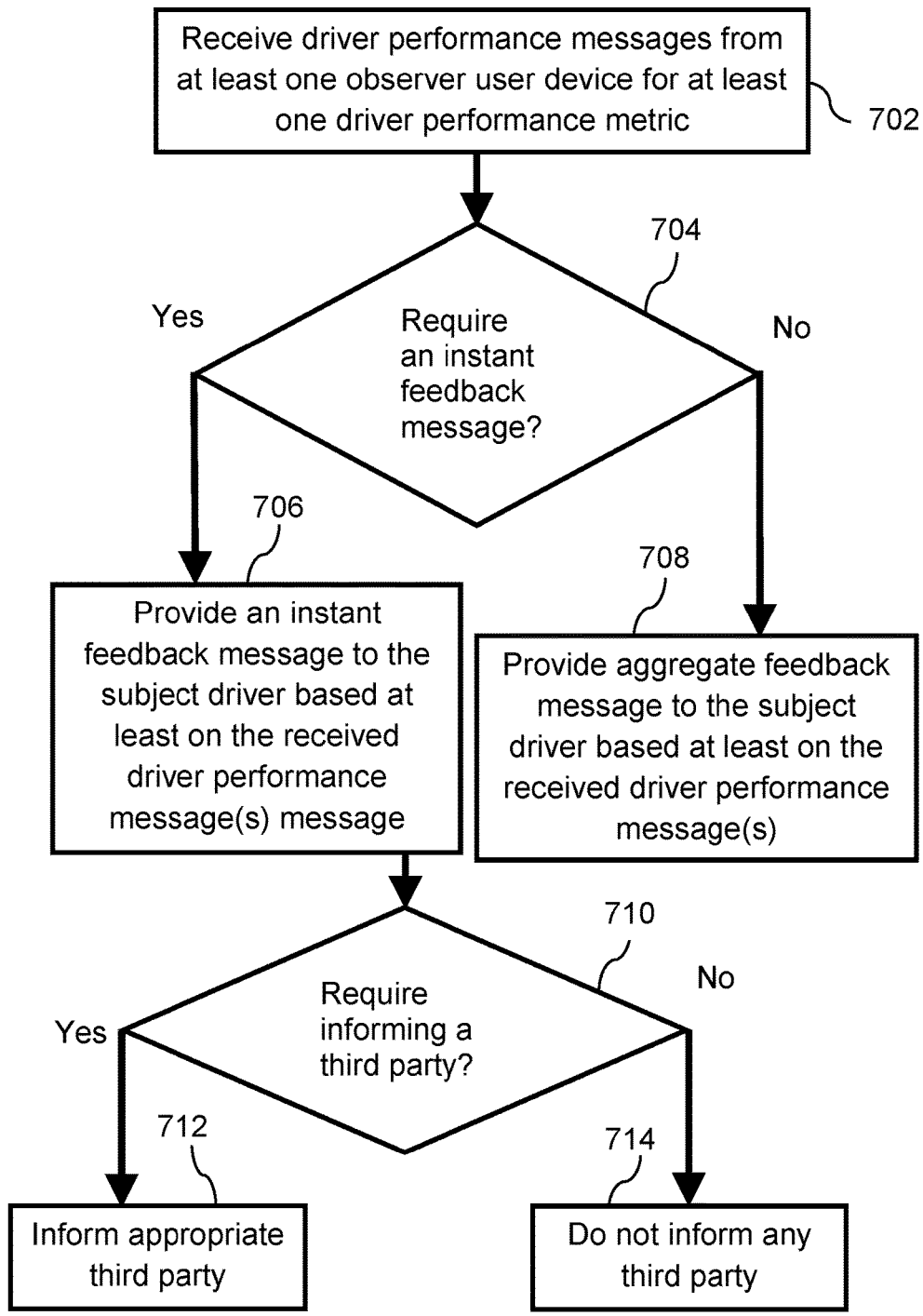
FIG. 7 is a flow chart illustrating a method for determining whether to report to a third party/entity about a subject driver's performance while driving a target vehicle according to an embodiment of the invention.

FIG. 7 illustrates a flow chart of a method for determining whether a subject driver requires instant feedback message in response to one or more driver performance messages and further determining whether a subject driver's driving behavior requires reporting to a third party such as a fleet management company, owner of the vehicle, parent/guardian of the subject driver, and/or police.

Steps 702 to 708 are the same or similar to the steps 402 to 408 in FIG. 4. At step 702, the method receives driver performance messages from at least one observer user for at least one driver performance metric.

At step 710, the method determines whether informing to a third party about the driving behavior of a subject driver is required in response to one or more received driver performance messages. For example, if one or more users send driver performance messages indicating that a subject driver is drunk or loses control of the vehicle or poses potential hazard to road users or may cause accident, (at step 712) the method may inform to an appropriate third party. In a non-limiting example, if the subject driver works for a fleet management company or a delivery company and the like, the system may inform that company about the driving performance of the subject driver. In another non-limiting example, if the subject driver is a teenager or learner driver, the method may inform parents, the owner of the vehicle or the driving instructor. In the user settings of the rating application program, information about to whom to inform about such driving events/behaviors may be entered by a subject driver with other user preferences and personalized settings. If the driver performance message does not require informing to a third party (at step 714), the method may not inform about the driving event to a third party. These driving events may also be identified using proximity sensors such as body sensors, a camera fitted inside and/or outside the target vehicle and other proximity sensors fitted at appropriate locations on neighboring vehicles and/or in the environment. In an embodiment, an observer user when sending driver performance messages may also indicate to inform to a third party based on the situation. However, the rating server system may determine whether to inform a third party based at least on the credibility of the observer user, type of driver performance message, evidence, and the like.

Figure 8A:
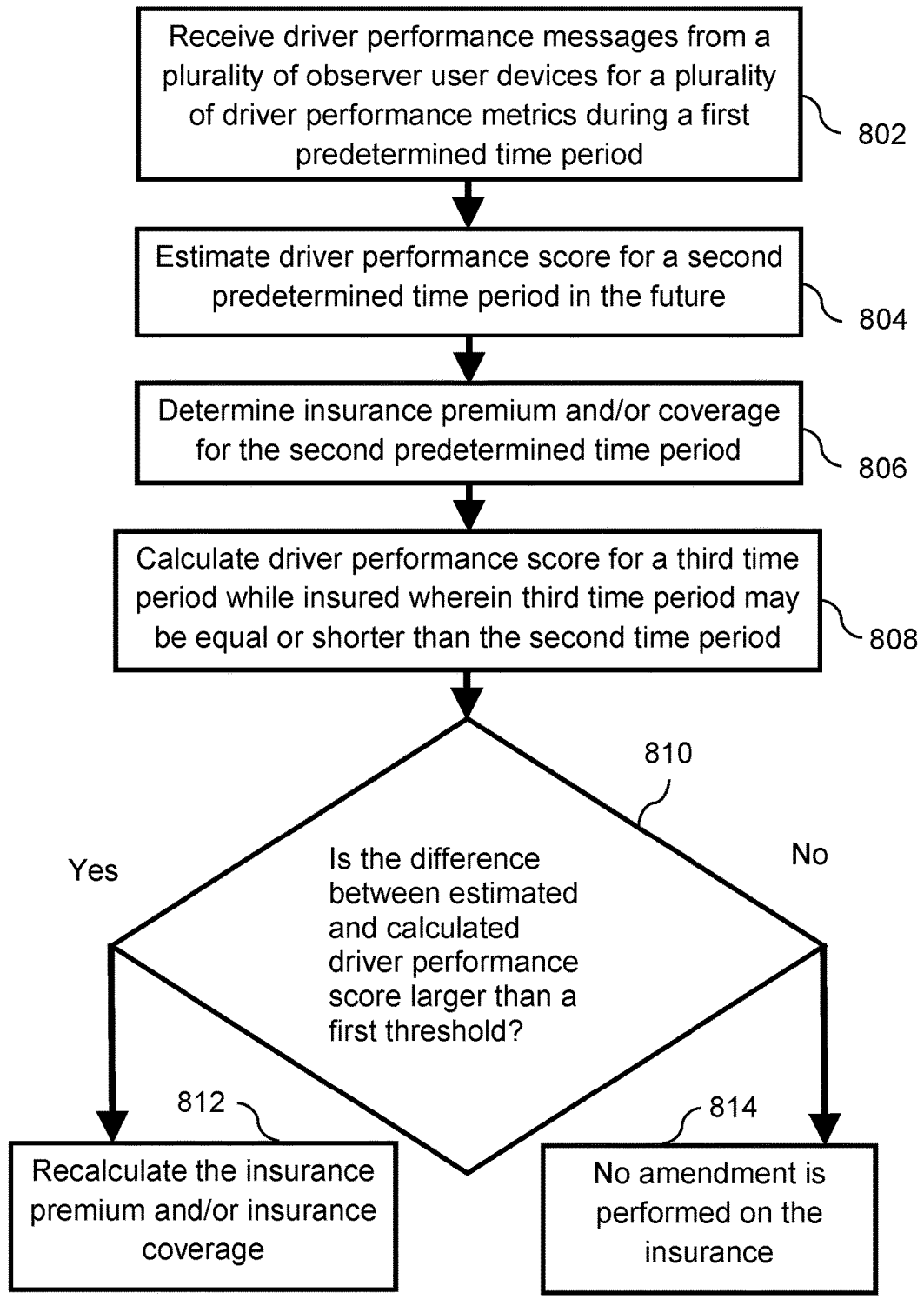
FIG. 8a is a flow chart illustrating a method for determining the insurance premium and/or insurance coverage based at least on an estimated integral rating and/or driver performance score for a future time period wherein the method continues to receive driver performance messages while insured and calculates an integral rating and/or driver performance score while insured to amend the insurance based at least on the difference between the estimated and the calculated values of integral rating and/or driver performance score according to an embodiment of the invention.

FIG. 8a illustrates a flow chart of a method for estimating a driver performance score and/or integral rating for a predetermined time in the future to determine insurance premium and/or insurance coverage according to a preferred embodiment. In this embodiment, the method may include determining insurance premium and/or insurance coverage based at least on estimated values of the driver performance score and/or integral rating for a future predetermined time period (this future time period may or may not include the time period for which insurance is to be covered). The driver performance score and/or integral rating for the future time period may be estimated using different methods including pattern recognition or machine learning algorithms. The method may further receive driver performance messages while insured (either the entire insured period or part of the insured period) and calculate a driver performance score and/or integral rating. The method compares the calculated driver performance score and/or integral rating to that of the estimated values. If the difference is larger than a predetermined threshold, the method recalculates the insurance premium and/or amends the insurance coverage. The predetermined time periods and other values may be chosen appropriately for the driver performance score and integral rating at different steps of the method by a person of ordinary skill in the relevant art. In a preferred embodiment the future time period may be the same as that of the time period for which the insurance is required.

At step 802, the method may receive driver performance messages from one or more observer users for one or more driver performance metrics associated with one or more driving events performed by a subject driver during a predetermined first time period. The first time period may include a present and/or past time.

At step 804, the method estimates a driver performance score for a future time period (predetermined second time period during which an insurance policy is requested) based at least on the driver performance messages received at step 802 using a pattern recognition or machine learning algorithm such as an artificial neural network, Bayesian estimation methods, Markov chain, particle filter, Kalman filter or other state of the art method known to an ordinary person skilled in the relevant art. In an alternative embodiment, the method may also estimate the integral rating and/or user defined driver performance score for a future time period for which insurance is required. In another embodiment, the second time period may be any appropriate time period including a future time period.

At step 806, the method calculates insurance premium and/or determines insurance coverage based at least on the estimated driver performance score obtained at step 804. In an alternative embodiment, the method may calculate insurance premium and/or insurance coverage based at least on the estimated integral rating and/or user defined driver performance score.

At step 808, the method may receive driver performance messages while insured and calculate the driver performance score for a predetermined third time period wherein the third time period may be equal to or shorter than the insured period. In an alternative embodiment, the method may also calculate the integral rating and/or user defined driver performance score. In a further embodiment, the third time period may be chosen appropriately short or long independent of the insured time period.

At step 810, the method calculates the absolute difference between the estimated driver performance score (obtained at step 804) and calculated driver performance score (obtained at step 808). If the absolute difference is larger than an appropriately chosen predetermined threshold (yes), at step 812, the method recalculates the insurance premium and/or amends insurance coverage. If the difference is smaller than the predetermined threshold (no), at step 814, the method performs no amendment to the insurance. In an alternative embodiment, the method may use an integral rating and/or user defined driver performance score instead.

In a further embodiment, the method may also use an element of the integral rating, user defined driver performance score, and/or other driver performance measure defined by a user in the steps 802 to 814. An ordinary person skilled in the relevant art may choose appropriate time periods and thresholds at different steps of the method to test, use or implement the invention. In another embodiment, this method may be used as it is or appropriately modified for other applications such as for providing other services and goods to customers or entities. The calculation of the driver performance score and/or integral rating may depend on one or more from a list including, but not limited to category of vehicle, geographic location, usage of the vehicle, time duration of insurance, and other factors that are relevant in calculating an insurance premium.

Figure 8B:
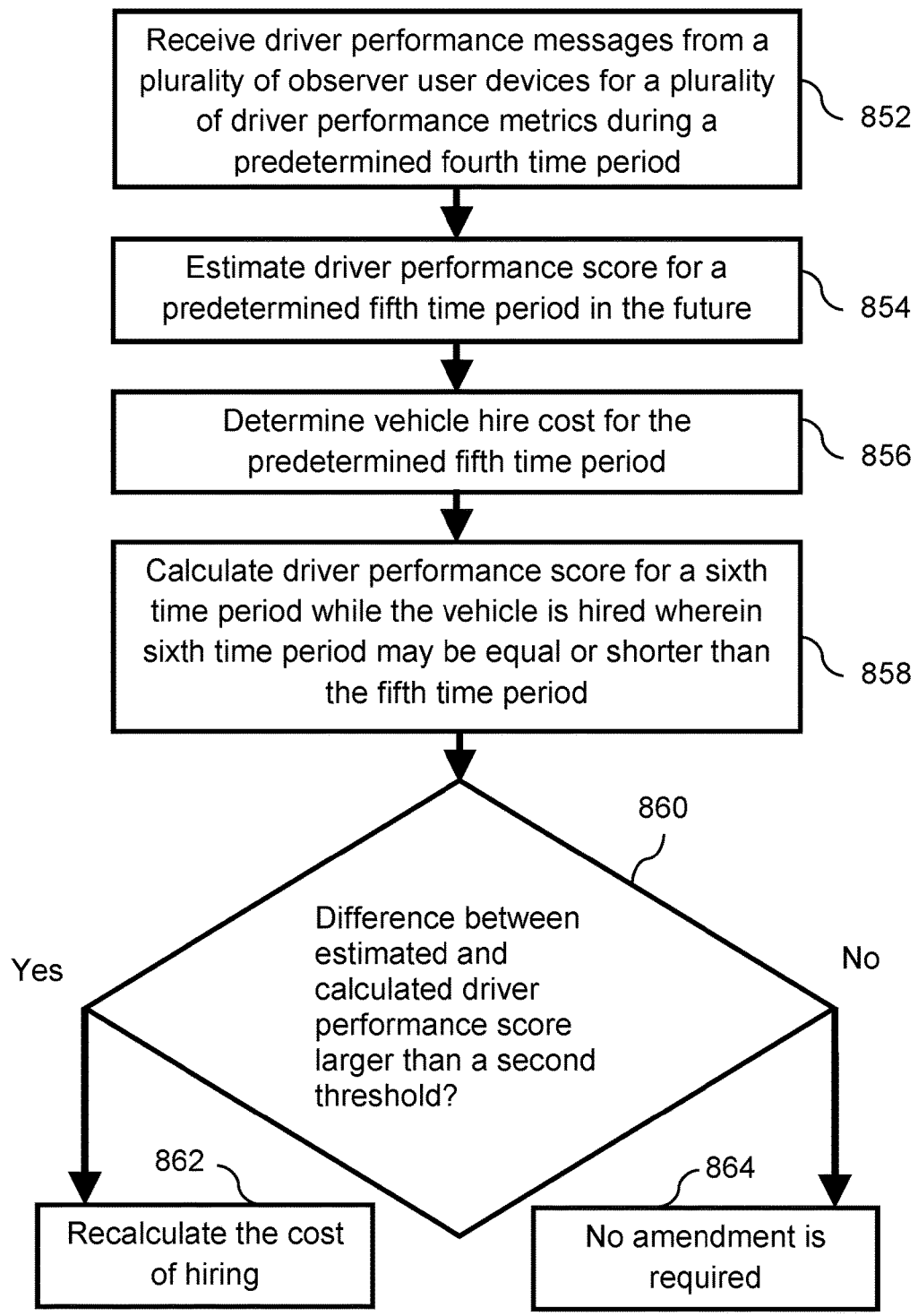
FIG. 8b is a flow chart illustrating a method for determining the cost of hiring a vehicle based at least on an estimated integral rating and/or driver performance score for a future time period wherein, the method continues to receive driver performance messages and calculates an integral rating and/or driver performance score while the vehicle is hired wherein, the method amends the cost of hiring if the difference between the estimated and the calculated values of an integral rating and/or driver performance score is larger than another predetermined threshold according to an embodiment of the invention.

FIG. 8b illustrates a flow chart of a method for estimating an integral rating and/or driver performance score for a predetermined time in the future to calculate the cost of hiring a vehicle according to an embodiment. In this embodiment, the method may determine the cost of hiring a vehicle based at least on estimated values of integral rating and/or driver performance score for a future predetermined time period wherein the future time period may or may not depend on the time period for which the vehicle is to be hired. In an embodiment, the method may estimate integral rating and/or driver performance score for the future predetermined time period by applying a pattern recognition or machine learning algorithm from a list including, but not limited to extrapolation, regression, Kalman filter, particle filter, Markov chain, Bayesian estimation algorithm, and artificial neural network. Based on the estimated integral rating and/or driver performance score, the method determines the cost of hiring the vehicle for a subject driver. The method may further receive driver performance messages while the vehicle is hired (the entire duration of hiring or part of the hiring period) and calculates the integral rating and/or driver performance score. Then, the method compares the calculated values of the integral rating and/or driver performance score to that of the estimated values respectively. If the difference is larger than a predetermined threshold, the method recalculates the vehicle hire cost. The predetermined threshold values and time periods may be chosen appropriately for the integral rating and/or driver performance score at different steps of the method by a person of ordinary skill in the relevant art. In an embodiment the future time period is the same as that of the time period for which the vehicle is to be hired.

The steps 852 to 864 are similar to the steps 802 to 814 illustrated in FIG. 8a except the calculation is of hiring costs instead of insurance premiums and insurance coverage. It will be appreciated that the predetermined time periods and thresholds may be different in calculating the hiring cost than calculating the insurance premium. In an embodiment, the driver performance messages, driver performance metrics, and the weights used in calculating the integral rating and/or driver performance score may be different for calculating vehicle hire cost than calculating insurance premium. In another embodiment, a user defined driver performance score may also be used in steps 852 to 864 instead of a driver performance score and/or integral rating. The driver performance score and/or integral rating may also be defined by a user according to some criteria including, but not limited to category of vehicle, location, usage of the vehicle, time duration of hiring, and other factors that are relevant in calculating the hiring cost.

Figure 9:
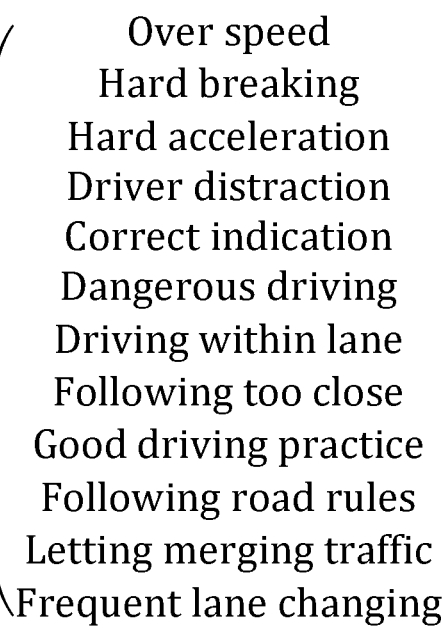
FIG. 9 shows a schematic illustration of a non-limiting example set of driver performance metrics according to an embodiment of the invention.

FIG. 9 shows a list of an example set of driver performance metrics that may be used to provide driver performance messages according to an embodiment. The list given in FIG. 9 is not an exhaustive list, but rather an example list to illustrate some of the metrics. An ordinary person skilled in the relevant art may use additional driver performance metrics, omit some of the metrics listed in FIG. 9, combine one or more metrics into a single metric or split a metric into two or more metrics depending on the application for which the driver performance messages are used or based on some other criteria. In a non-limiting example, hard acceleration, hard braking cutting in front of another vehicle, over speed, and frequent lane changes may be combined to form a single metric labelled "dangerous driving". Although, a number of metrics are listed in FIG. 9 to rate the performance of a subject driver of a target vehicle, it is also possible for an observer user to rate the performance of a subject driver for overall driving performance or other appropriate measure according to an alternative embodiment.

FIG. 10*a* shows a schematic illustration of combining ratings/driver performance messages received for a plurality of driver performance metrics according to an embodiment. In particular, FIG. 10*a* illustrates a non-limiting example of linearly combining driver performance messages received for five different metrics (metric 1, metric 2, metric 3, metric 4, and metric 5). The metric 1 to 5 may include, but is not limited to some of the driver performance metrics listed in FIG. 9. Although FIG. 10*a* illustrates combining five metrics, it will be appreciated that an implementation may include any number of metrics in the driver performance rating system. In the non-limiting example illustration shown in FIG. 10*a*, the weights ($A_1$, $A_2$, $A_3$, $A_4$, and $A_5$) are chosen such that the sum of all the weights is equal to 1. However, it will be appreciated that the weights may be chosen to satisfy different conditions depending on the application or other criteria.

In another embodiment, the weights may be chosen to be equal for all the metrics. In yet another embodiment, the weight assigned for a driver performance metric may vary linearly or nonlinearly with the number of times the driver performance messages received and/or from how many users the messages are received during a predetermined time.

In an embodiment, the driver performance messages for the driver performance metrics listed in FIG. 9 may be in the form of a star rating, alert, caution, warning and/or an appropriate form depending on the driver performance metric.

FIG. 10*b* shows a schematic illustration for combining ratings/driver performance messages received from a plurality of users according to an embodiment. In this non-limiting example, only 5 users (users 1 to 5) are shown, however, the actual number of users may vary. The terms $B_1$, $B_2$, $B_3$, $B_4$, and $B_5$ are the weights assigned to driver performance messages received from different observer users. These weights for different users may be chosen depending on the application and/or credibility of the users who provided the driver performance messages. In an implementation, the sum of these weights may be equal to 1. In another implementation, the sum of weights may not be equal to 1.

Figure 11:
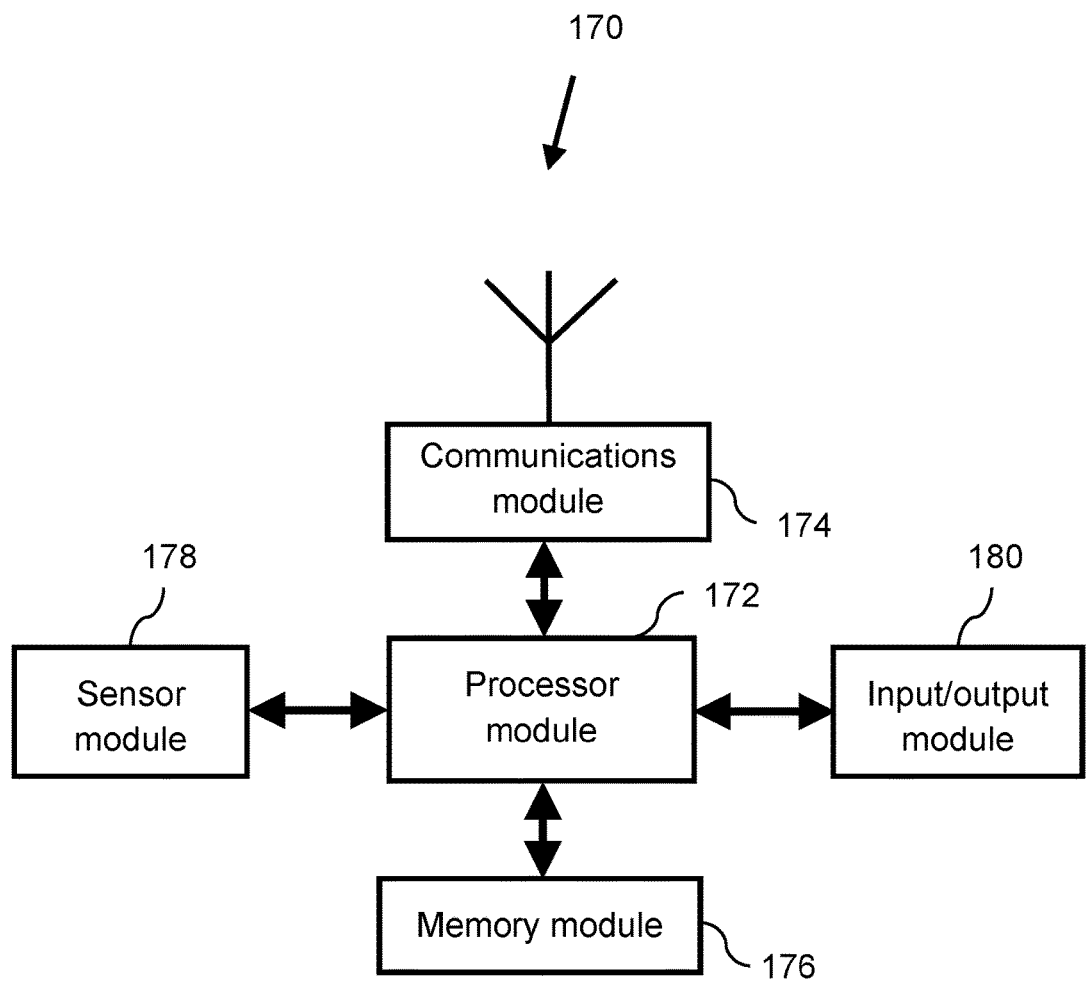
FIG. 11 illustrates a block diagram of an example user device according to an embodiment of the invention.

FIG. 11 illustrates a block diagram of a user device 170 including a processor module 172 (non-limiting examples include computer processor, microprocessor, and other processors known to a person of ordinary skill in the relevant art), a communications module 174, a memory module 176, a sensor (proximity sensor) module 178, and an input/output module 180 in accordance with an embodiment of the invention. It will be appreciated that FIG. 11 illustrates non-limiting example components of a computing device that may be in a typical user device. FIG. 11 and the description provided are brief and general components of a computing device that may be used as a user device. However, various aspects can be implemented on it. The user device may include additional modules such as a power control device (not shown) and other hardware and/or software components required for the operation of a computing device. The user device may be a smart phone, tablet, computer, portable device, navigation device or built-in computer system in a motor vehicle. In FIG. 11, although the example components illustrated as separate modules, some of these modules may be built as a single integrated module in the user device. Moreover, some of the blocks illustrated in the user device may be built into more than one unit in the user device. The different modules in the user device may be interconnected through a data bus (not shown) which is able to transmit data between different modules in a computing device.

The input/output module 180 is operably connected to processor module 172 to be able to interact with the user device. The input/output module 180 may be a touch display (smart screen) to act as an input and output module. In one implementation, the input module may include a hardware keyboard, software keyboard, a touch pad, pointing device, and visual or voice based input device. The output module may include a display screen, audio device, haptic device, vibration device, any other visual output device and the like. A user device may include multiple input devices and multiple output devices.

The sensor (proximity sensor) module 178 may have a plurality of sensing systems including, but not limited to a camera, global positioning system (GPS) device, accelerometer, body sensors, and inertial navigation system. Sensor module 178 is operably connected to processor module 172 to send the sensed data to be processed by the processor. In an example embodiment, GPS data may be used by a rating server to verify that both the users (the observer user who provided driver performance message for a driving event and the user (subject driver) who receives driver performance message) are within a predetermined distance at the time of occurrence of the driving event for which the driver performance message is received.

Memory module 176 may include a volatile and/or non-volatile computer readable storage medium that is able to store software programs and data to implement the functionality of the rating application on a user device. For example, memory module 176 may include a Random Access Memory (RAM), Read Only Memory (ROM), flash memory or any other form of long term and/or short term memory. In another implementation, the memory may also include hard disk drive, floppy disk drive, tape drive, secure digital (SD) card, digital versatile disc random access memory (DVD-RAM), or any other appropriate form of storage medium.

Processor module 172 is operably connected to a communication module 174, input/output module 180, a memory module 176, and a sensor module 178. The processor module may also be connected to other modules/devices (not shown) within a user device. Processor module 172 may include, but is not limited to a microprocessor unit, graphical processor unit, digital signal processor or any other processor that may execute computer program instructions on data to produce the expected output. The processor module may include, but is not limited to registers, buffers, control logic, data lines, arithmetic and logic unit, and other appropriate components. In an embodiment the processor may be one or more from a list including single processor, multi processors, single-core, and multi-core processors. Processor module 172 may execute machine instructions to produce an output on an output device, or send data to a peripheral device interface or other interfaces. In an example implementation of a user device, a plurality of hardware processors, memory types, and data busses may be present.

In an implementation, processor module 172 may receive user input through one or more input devices such as a touch screen, and keyboard. Processor module 172 may execute instructions that include program instructions stored in memory within the user device or stored externally. The processor module may perform computations based on the stored instructions, user input and other input data to produce an output that may be presented to the user (non-limiting example: output may be displayed on screen) or sent to an interface module such as network interface, sensor module or other appropriate control module. In an implementation, the processor module may be implemented as a single chip or multiple chips that may include a plurality of digital and analogue processors.

In a user device, processor module 172 is connected sensor module 178 to receive sensor data from sensor module 178. The processor module is also connected to the input/output module to receive input and send output data. The processor module is further connected to communication module 174 to establish a wireless connection to communicate to the server systems (rating server 106 and coaching server 108), and other devices via the Internet or other appropriate radio communication link. Further, the processor is connected to memory module 176 to store and retrieve information. The user device may be connected to external devices through appropriate wireless connections including a peer-to-peer connection.

Communication module 174 may provide the required features including signal processing (non-limiting examples: analogue and digital signal processing) to communicate to other user devices and server systems (rating server 106 and coaching server 108). The components of communication module 174 may include, but are not limited to one or more from the following list: transceiver, antenna, signal processor, modulator, demodulator, and other appropriate components known to a person of ordinary skill in the relevant art. A user device may communicate with other users or with the server systems using one or more communication technologies including, but not limited to cdma2000, WCDMA, WiMAX, Wi-Fi, Wi-Fi Direct, BLUETOOTH, GPRS, 3G, 4G, LTE, and other appropriate communication technologies. The user device may also communicate using one or more protocols including Internet Protocol (IP), Transmission Control Protocol (TCP), User Datagram Protocol (UDP), and Real-time Transport Protocol (RTP). An ordinary person skilled in the relevant art may use one of the above listed protocols or any other appropriate state of the art communication technology to use and/or implement the invention.

The user device may include mechanisms to identify the current location of the device. A geographic location identification system may include one or more from a list including, but not limited to an inertial navigation sensor system, satellite based navigation system, image/street view based localization system, radio communication based location identification, wireless access point based location identification system, LIDAR, radar and other appropriate localization system that is known to an ordinary person skilled in the relevant art. The measurements that may be used in localization include time of arrival, time difference of arrival, return time of flight, angle of arrival, cell identification and the like.

The user device may have an operating system such as Windows (by Microsoft), iOS (by Apple), and Android (by Google). The user device may also include hardware, firmware, and software modules including, but not limited to an antenna to communicate wirelessly to the Internet, a call managing module to provide the required functionality to make and receive telephone calls, a short message service (SMS) module to send and receive SMS, a camera device to capture photo and/or video, a media player module to play multimedia content, and an Internet web browser. A user device may also have additional applications installed such as a calculator, games, calendar, text editor and the like.

Figure 12:
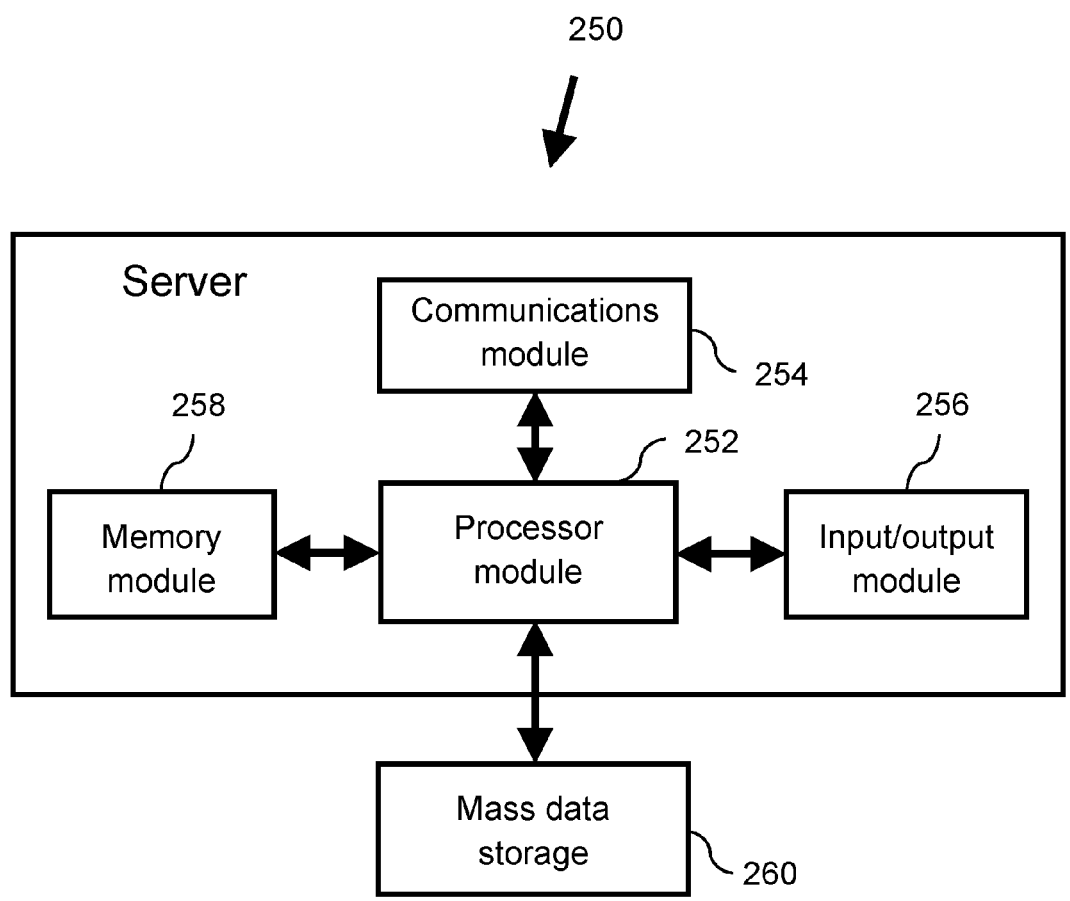
FIG. 12 illustrates a block diagram of an example computer server system according to an embodiment of the invention.

FIG. 12 illustrates a block diagram of a server system 250 including a processor module 252, a communication module 254, an input/output module 256, and a memory module 258 in accordance with another embodiment of the invention. It will be appreciated that FIG. 12 illustrates non-limiting example components of server system 250. However, the server may include additional components such as a power control module (not shown), other hardware, firmware, and software modules as required for the operation of a computer server system. Although, the example components are illustrated as separate modules, some of these modules may be built as a single integrated module. Further, some of the blocks illustrated may be built as more than one unit in the server. For example, input/output module 256 may be made into more than one module such as an input module and an output module. The different modules in the server may be interconnected through an appropriate data bus (not shown) which is able to transmit data between different modules in a computer server system.

Processor module 252 is operably connected to other modules such as communication module 254, input/output module 256, and memory module 258. The processor module may also be operably connected to a mass data storage 260 via an appropriate medium such as a data bus (not shown), wired connection or wireless connection through an appropriate interface. For example, if the mass data storage 260 is implemented within the server computer, it may be connected using an appropriate data bus. However, if mass data storage 260 is an external device, then it may be connected via a wired or wireless connection as appropriate through an appropriate interface.

Communications module 254 provides the necessary functions for the server to receive driver performance messages from user devices, other appropriate data from appropriate sources, and send relevant information (including feedback message and coaching) to a subject driver of a vehicle as appropriate. Communication module 254 may be designed or appropriately selected to support the required data transfer and communication technology used for communicating to the user device.

Input/output module 256 may be a single module (non-limiting example: a touch sensitive display) or separate input and output modules. The input module receives external input for the operation of the server. For example, input devices may include a hardware keyboard, software keyboard, mouse, voice, and other appropriate forms of input. The output device presents the output via an appropriate device such as a display device, sound, vibration, haptic or any other appropriate device.

Memory module 258 may include a volatile and/or nonvolatile memory for the correct operation of the server. Example memory devices include, but are not limited to a Random Access Memory (RAM), Read Only Memory (ROM), flash memory, hard disk drive, floppy disk drive, tape drive, secure digital (SD) card, digital versatile disc random access memories (DVD-RAM), or any other appropriate form of storage medium.

Mass data storage device 260 is appropriately connected to the server such that the server may request for data and the mass storage device responds to the request appropriately. The mass data storage device may store the driver performance message with a time stamp and related data in an appropriate format. The data may include one or more from a list including, but not limited to, type of driving event, location of event, time of event, any evidence (such as photo, video, and comments), user who provided the driver performance message, type of driver performance message, driver who performed the driving event and the like. The data may be stored in a database or data files or any other appropriate form.

The server may be a personal computer (non-limiting examples: laptop, desktop computer with appropriate resources such as memory, processing power, communication data rate, and hardware/software reliability), a remote server or a network server accessible via an appropriate communication medium. A personal computer correctly configured to act as a server may communicate to the user device via an appropriate medium. A server may be located in a local area network, wide area network, or any other appropriate network. The server may also be connected to the Internet or implemented on a cloud based system.

In an implementation, the system may be implemented as a client-server model where the user devices act as clients and the two servers (rating server 106 and coaching server 108) act as a host. The client may communicate to the remote server through one or more types of networks.

A computer program or applications program may be stored in one or more computer readable mediums, may contain machine instructions such that when these instructions are executed, a device performs one or more functions described in one or more embodiments. The computer program may be implemented in one or more computer languages from a list including machine language, assembly language (example: Z80 instruction set), procedural language (example: C) and object oriented language (example: C++ and JAVA). A computer program (also referred to as a rating program/rating application program/application program in this document) may also be implemented in hardware, programmable hardware, firmware, software, and any combination thereof. The different embodiments and implementations of the system, method, and computer program product described in this document may be realized with one or more from a list including, but not limited to analogue electronic circuit, digital electronic circuit, integrated circuit, field-programmable gate array, application specific integrated circuit, computer hardware, software, firmware, and other appropriate form of implementation.

Although a number of embodiments have been described in this document, it would be appreciated that they may dependent on conditions including the road layout, traffic-related restrictions, road rules, driving restrictions (left hand driving, right hand driving, type of road, region, state, territory, and country). The examples and embodiments given in this document are not exhaustive Although the invention has been described herein with particular embodiments, one skilled in the art will understand that various modifications, changes and variations may be made in the elements, steps, operation, and details of the method, system and computer program product described herein without departing the scope thereof. The described invention may be implemented with some components removed or other components added to the method or system without departing from the invention. The different steps illustrated in the figures may not require the particular order shown in the example figures. Additionally, some steps may be eliminated or some steps may be added or the order of some of the steps may be changed to the described flow of steps. Furthermore, one or more steps illustrated in one figure may be appropriately included into another figure in the implementation of the invention without departing from the scope of the invention. It is intended that the invention described herein is not limited to only the embodiments or examples described.

What is claimed is:

1. A dynamic learning autonomous driving system, comprising:
   at least one observer user device, each observer user device including a computer processor, a transceiver, a proximity sensor, and a user communications interface, said computer processor being configured to identify a target vehicle being driven by an autonomous driving system; and
   a remote computer processor, said remote computer processor being configured to obtain the identification of the target vehicle being driven by the autonomous driving system from said observer user device, said remote computer processor being configured to aggregate, from a plurality of said observer user devices, vehicle driving data of the target vehicle being driven by the autonomous driving system, said remote computer processor being configured to adjust at least one calibration factor to improve driving performance of the autonomous driving system of the identified target vehicle based on the aggregate vehicle driving data obtained from said plurality of observer user devices.

2. A system for dynamically adjusting driving behaviour, comprising:
   a computer processor configured to identify a target vehicle being driven by a subject driver, wherein identifying includes using a proximity sensor in at least one of the target vehicle and a vehicle carrying an observer user device; and
   a non-transitory computer readable medium encoded with a computer program coupled to said computer processor that when executed cause the processor to:
   receive at least one driver performance message from a plurality of observer user devices over a communications network, the driver performance message including an identity of the target vehicle and data relating to at least one driver performance metric associated with the subject driver of the target vehicle; and determine a driver performance score of the subject driver based on an aggregation of driver performance messages from the plurality of observer user devices for a plurality of driver performance metrics verify the correctness of the received driver performance message by comparing the data relating to the driver performance metric associated with the subject driver with data obtained from at least one sensor data wherein the sensor is either in the observer user device or in the target vehicle or in the environment.

3. The system of claim 2, wherein the computer program encoded on said non-transitory computer readable medium includes instructions that when executed by said computer processor cause said computer processor to send an aggregate driver feedback message to a user device in the target vehicle within a predetermined time of an initial driver performance message being received at the remote computer processor, the initial driver performance message including at least one of the identity of the target vehicle, the identity of the subject driver, and the identity of the observer user device, the driver performance message further including data relating to at least one driver performance metric associated with the subject driver of the target vehicle.

4. The system of claim 2, wherein the computer program encoded on said non-transitory computer readable medium includes instructions that when executed by said computer processor cause said computer processor to generate one of an insurance premium and a cost of hiring a vehicle for the subject driver based on the driver performance score.

5. A method for dynamically adjusting driving behaviour, comprising:
identifying, with an observer user device, at least one of a target vehicle and a subject driver associated with the target vehicle;
receiving, at a remote computer processor, at least one driver performance message from a plurality of the observer user devices over a communications network, the driver performance message including the identity of the target vehicle and/or the identity of the subject driver, the driver performance message further including data relating to at least one driver performance metric associated with the subject driver of the target vehicle;
determining, at the remote computer processor, a driver performance score of the subject driver based on an aggregation of some or all driver performance messages from the plurality of observer user devices; and
wherein identifying includes using a proximity sensor in at least one of the target vehicle and a vehicle carrying the observer user device.

6. The method of claim 5, further comprising wherein sending a driver feedback message to the subject driver through the communication network, after an initial driver performance message being received at the remote computer processor.

7. The method of claim 5, further comprising flagging, at a database of driver profiles, a driver profile of the subject driver with a negative rating if the driver performance score of the subject driver is below a predetermined threshold.

8. The method of claim 7, wherein the negative rating triggers a recommendation for driver coaching for the subject driver.

9. The method of claim 5, further comprising flagging, at a database of driver profiles, a driver profile of the subject driver with a positive rating if the driver performance score of the subject driver is above a predetermined threshold.

10. The method of claim 9, wherein the positive rating triggers a reward or discount for the subject driver.

11. The method of claim 5, wherein the driver performance score is determined by combining driver performance messages relating to a particular driver performance metric associated with the subject driver.

12. The method of claim 5, wherein the determination of the driver performance score is conducted after normalizing the data related to a driver performance metric, wherein the normalization is performed to account for individual differences between the observer users in providing the driver performance messages to the subject driver.

13. The method of claim 5, further comprising verifying, with a proximity sensor in the observer user device, the data related to a driver performance metric associated with the subject driver wherein the data related to the driver performance metric is verified for correctness by comparing with the proximity sensor data.

14. A method for dynamically adjusting driving behaviour, comprising:
identifying, with an observer user device, at least one of a target vehicle and a subject driver associated with the target vehicle;
receiving, at a remote computer processor, at least one driver performance message from at least one of the observer user devices over a communications network, the driver performance message including at least one of an identity of the target vehicle, an identity of the subject driver, and an identity of the observer user device, the driver performance message further including data relating to at least one driver performance metric associated with the subject driver of the target vehicle; and
checking whether an instant feedback message is required;
if instant feedback is required, then sending, from the remote computer processor, a driver feedback message through a network interface, addressed to an address of the subject driver associated with the target vehicle only after an initial driver performance message being received at the remote computer processor, the initial driver performance message including at least one of the identity of the target vehicle, the identity of the subject driver, and the identity of the user device, the driver performance message further including data relating to at least one driver performance metric associated with the subject driver of the target vehicle verify the correctness of the received driver performance message by comparing the data relating to the driver performance metric associated with the subject driver with data obtained from at least one sensor data wherein the sensor is in the observer user device or in the target vehicle or in the environment.

15. The method of claim 5, further comprising generating, using the driver performance score, at least one of an insurance premium for the subject driver and a cost of hiring a vehicle.

16. The method of claim 5, further comprising verifying, with at least one onboard proximity sensor in the target vehicle which produces vehicle driving data, the data relating to the at least one driver performance metric associated with the subject driver wherein the data relating to the driver performance metric is verified for correctness by comparing with the onboard proximity sensor data.

17. The method of claim 5, wherein the determination of the driver performance score is conducted after removing outliers outside a predetermined range in the data relating to a driver performance metric.

18. A method for dynamically adjusting driving behaviour, comprising:
  identifying, with an observer user device, at least one of a target vehicle and a subject driver associated with the target vehicle;
  receiving, at a remote computer processor, at least one driver performance message from at least one of the observer user devices over a communications network, the driver performance message including at least one of an identity of the target vehicle, an identity of the subject driver, and an identity of the observer user device, the driver performance message further including data relating to at least one driver performance metric associated with the subject driver of the target vehicle; and
  determining, at the remote computer processor, a driver performance score of the subject driver based on an aggregation of some or all driver performance messages from the plurality of observer user devices;
wherein the determination of the driver performance score is based on the receiving of driver performance messages within a first predetermined time period, and further comprises:
  generating an estimated driver performance score for a second predetermined time period, based on the determination of the driver performance score over the first predetermined time period wherein the second predetermined time period is in the future;
  determining a second driver performance score of the subject driver based on an aggregation of some or all driver performance messages from the plurality of observer user devices over a third predetermined time period; and
  recalculating an insurance premium of the subject driver if the difference between the estimated driver performance score and the second driver performance score is above a predetermined threshold.

19. The method of claim 5, further comprising verifying, by comparing the data relating to the driver performance metric associated with the subject driver with driver performance messages received from other observer user devices wherein the comparison is performed to check whether the data relating to the driver performance metric received from one observer user is correct compared to the driver performance messages received from other observer users.

20. A method for dynamically adjusting driving behaviour, comprising:
  identifying, with an observer user device, at least one of a target vehicle and a subject driver associated with the target vehicle;
  receiving, at a remote computer processor, at least one driver performance message from at least one of the observer user devices over a communications network, the driver performance message including at least one of an identity of the target vehicle, an identity of the subject driver, and an identity of the observer user device, the driver performance message further including data relating to at least one driver performance metric associated with the subject driver of the target vehicle;
  determining, at the remote computer processor, a driver performance score of the subject driver based on an aggregation of some or all driver performance messages from the plurality of observer user devices; and
wherein the subject driver is an autonomous driving system coupled to the target vehicle.

21. A computer program product embodied in a computer readable storage medium for dynamically adjusting driving behaviour, the computer program product comprising programming instructions that when executed, cause a coupled processor to:
  identify, with an observer user device, a target vehicle being driven by a subject driver;
  receive, at a remote computer processor, at least one driver performance message from at least one observer user device over a communications network, the driver performance message including at least one of an identity of the target vehicle, an identity of the subject driver, and an identity of the observer user device, the driver performance message further including data relating to at least one driver performance metric associated with the subject driver of the target vehicle; and
  send an instant driver feedback message to a user device in the target vehicle after an initial driver performance message being received at the remote computer processor, the initial driver performance message including at least one of the identity of the target vehicle, the identity of the subject driver, and the identity of the observer user device, the driver performance message further including data relating to at least one driver performance metric associated with the subject driver of the target vehicle wherein the initial driver performance message is initiated by the observer user.

22. The computer program product of claim 21, further comprising programming instructions causing the coupled computer to verify with at least one on board proximity sensor in the target vehicle which produces vehicle driving data, the data related to the at least one driver performance metric associated with the subject driver wherein the data related to the driver performance metric is verified for correctness by comparing with the proximity sensor data.

23. The computer program product of claim 21, further comprising programming instructions causing the coupled computer to generate one of an insurance premium and a cost of hiring a vehicle for the subject driver based on a driver performance score wherein, the driver performance score of the subject driver is determined based on an aggregate of some or all the driver performance messages from the plurality of observer user devices for at least one driver performance metric.

24. The computer program product of claim 21, further comprising programming instructions causing the coupled computer to determine a driver performance score based on the receiving of driver performance messages within a first predetermined time period, wherein the programming instructions further cause the coupled computer to:
  generate an estimated driver performance score for a second predetermined time period, based on the determination of the driver performance score over the first predetermined time period wherein the second predetermined time period is in the future;
  determine a second driver performance score of the subject driver based on an aggregate of some or all driver performance messages from the plurality of observer user devices over a third predetermined time period; and recalculate an insurance premium of the subject driver if the difference between the estimated driver performance score and the second driver performance score is above a predetermined threshold.

* * * * *